(12) United States Patent
Adhikari et al.

(10) Patent No.: US 7,222,082 B1
(45) Date of Patent: May 22, 2007

(54) BUSINESS VOLUME AND WORKFORCE REQUIREMENTS FORECASTER

(75) Inventors: Chandan Adhikari, Quincy, MA (US); John T. Anderson, Brookline, MA (US); Mark E. Bucci, Sandwich, MA (US); Paul J. Piccolomini, Leominster, MA (US); Dennis H. Smith, Concord, MA (US); Joseph A. Velazquez, Hopkinton, MA (US)

(73) Assignee: Kronos Technology Systems Limited Partnership, Chelmsford, MA (US)

( * ) Notice: Subject to any disclaimer, the term of this patent is extended or adjusted under 35 U.S.C. 154(b) by 1037 days.

(21) Appl. No.: 09/649,122

(22) Filed: Aug. 28, 2000

Related U.S. Application Data

(60) Provisional application No. 60/214,393, filed on Jun. 28, 2000.

(51) Int. Cl.
*G06Q 10/00* (2006.01)
(52) U.S. Cl. .............................................. 705/8; 705/7
(58) Field of Classification Search ............. 705/7–10, 705/2–4
See application file for complete search history.

(56) References Cited

U.S. PATENT DOCUMENTS

| | | | | |
|---|---|---|---|---|
| 4,852,001 A | * | 7/1989 | Tsushima et al. ............... | 705/8 |
| 5,111,391 A | | 5/1992 | Fields et al. .................... | 705/9 |
| 5,164,897 A | | 11/1992 | Clark et al. ..................... | 705/1 |
| 5,182,705 A | | 1/1993 | Barr et al. ...................... | 705/11 |
| 5,274,571 A | * | 12/1993 | Hesse et al. ................. | 700/291 |
| 5,325,292 A | | 6/1994 | Crockett ......................... | 705/9 |
| 6,574,605 B1 | * | 6/2003 | Sanders et al. ................. | 705/8 |
| 6,587,831 B1 | * | 7/2003 | O'Brien .......................... | 705/8 |
| 6,609,101 B1 | * | 8/2003 | Landvater ..................... | 705/10 |
| 2001/0049619 A1 | * | 12/2001 | Powell et al. .................. | 705/9 |

FOREIGN PATENT DOCUMENTS

JP          08-314727          * 11/1996

OTHER PUBLICATIONS

Anoymous, information available from the Kronos web site, Apr. 24, 1999, 12 pages.*
Conary, Mary, "Kronos announcesrelease of Smart Scheduler software", Business Wire, Sep. 23, 1993, No. 6428113, 2 pages.*

(Continued)

*Primary Examiner*—C. Luke Gilligan
*Assistant Examiner*—Vivek Koppikar
(74) *Attorney, Agent, or Firm*—Weingarten, Schurgin, Gagnebin & Lebovici LLP

(57) ABSTRACT

A business volume and workforce requirements forecaster includes a business structure, a forecast structure, certain hierarchical levels which map to corresponding levels in the business structure, a volume forecaster which forecasts business volume responsive to historical data and to the business and forecast structures, and a workforce requirements engine which forecasts workforce requirements responsive to the forecast business volume. Business volume is forecast for a predefined duration, responsive to both a first set of historical data, and to the business and forecast structures. Calculation of workforce requirements includes task level consolidation and resource leveling, and can include dynamic standard assignment, wherein different metrics are selected at different times, and where a task is associated with a plurality of standards. An event calendar is defined, and at least one event is selected from the calendar and considered in the step of forecasting.

34 Claims, 19 Drawing Sheets

OTHER PUBLICATIONS

Anonymous, "Kronos Unveils Smart Scheduler, the First Client/server, Enterprise/Employee Scheduling Solution for Retailers", Business Wire, Jan. 11, 1999, No. 37938513, 5 pages.*

"Instant weekends: arrange seven-day work schedules to give every employee two consecutive days off," by Everette Gardner from Dialog file 275 (Gale Group); Nov. 1990, Accession No. 09577449.*

"Simple Approaches to Shift, Days-Off and Tour Scheduling Problems," by James G. Morris and Michael J. Showalter from the JSTOR database, Management Science, vol. 29, No. 8 (Aug. 1983), p. 942-950.*

"Understanding simulation solutions to resource constrained project scheduling problems with stochastic task durations," Abel A. Fernandez et al; Engineering Management Journal, vol. 10, No. 4. p. 5-13, Dec. 1998, ISSN 1042-9247 and Dialog ID No. 01766486.*

Workforce Scheduler, Kronos Incorporated, 2003.

Workforce Smart Scheduler, User Guide, Kronos Incorporated, Jun. 2001.

* cited by examiner

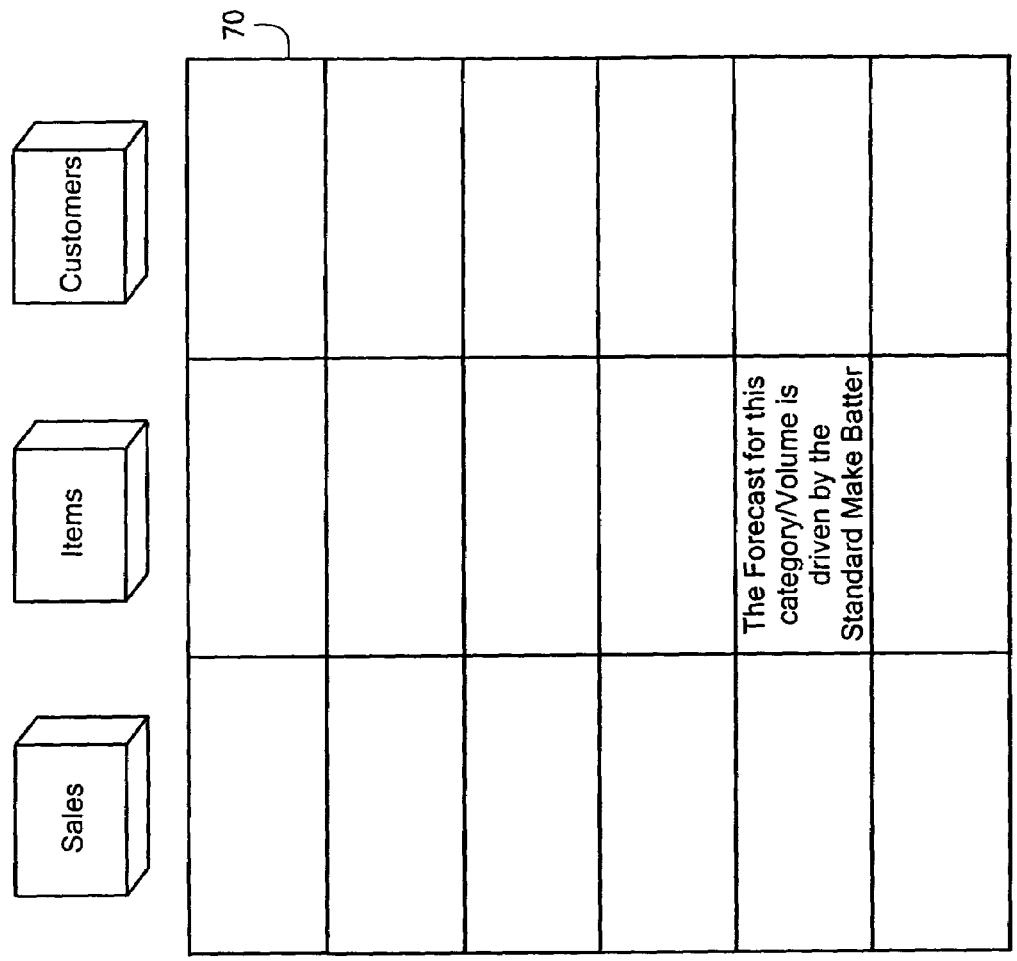
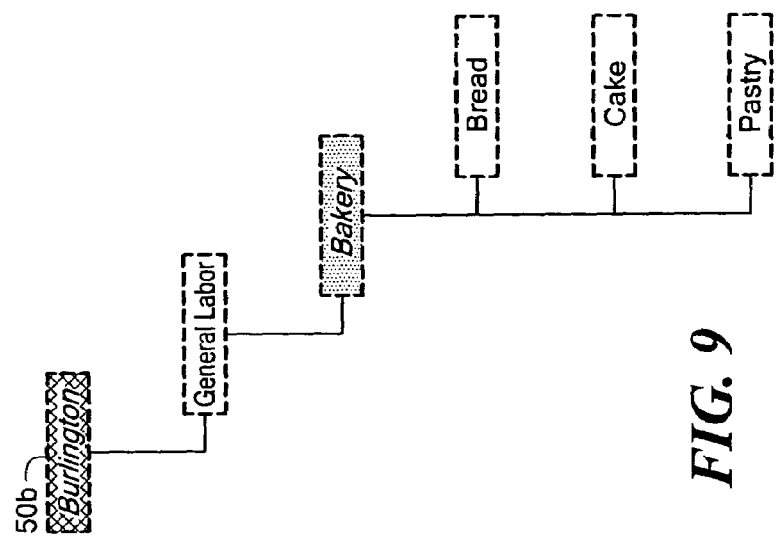
FIG. 9

People-Planner Toolbox - [Forecaster]

File Tabs Forecast View Reports Help

Forecast Date: 11/17/97 — 170

172

- Root
  - Front End
    - Register
      - Cash
      - Credit
    - Store
  - Food
    - Bakery
      - Bread
      - Cakes
      - Pastry
    - Dairy
      - Cheese
      - Ice Cream
      - Milk
      - Yogurt
    - Deli
      - Gyros
      - Hoagies
      - Pita
      - Sandwiches
      - Subs

| Forecast Volume | Edit Workforce |
| Forecast Labor | Edit User Defined |
| Reset All | Apply Edits Now |

— 180

Summary | Traffic Pattern | Event History | Sales History — 174

Volume Forecast

| | SALES | ITEMS | CUSTOMERS | WEIGHTS — 176 |
|---|---|---|---|---|
| Mon 11/17 | 3,874,194.66 | 1,396,011.11 | 526,118.02 | |
| Tue 11/18 | 5,002,368.51 | 1,804,556.72 | 683,004.02 | |
| Wed 11/19 | 5,110,994.04 | 1,842,385.24 | 695,343.94 | |
| Thu 11/20 | 4,037,711.47 | 1,452,588.13 | 544,672.02 | |
| Fri 11/21 | 5,521,407.30 | 1,993,275.16 | 756,386.12 | |
| Sat 11/22 | 3,228,623.38 | 1,163,309.37 | 438,498.91 | |
| Sun 11/23 | 2,582,883.63 | 930,658.16 | 350,744.37 | |
| Total | 29,358,182.00 | 10,582,883.89 | 3,994,767.46 | |

Labor Forecast  All Departments

| | FrontEnd:Bagger | FrontEnd:Cashier | Bakery:Baker | Bakery:C — 178 |
|---|---|---|---|---|
| Mon 11/17 | 54.00 | 0.00 | 5,913.25 | 0.00 |
| Tue 11/18 | 44.75 | 0.00 | 7,883.50 | 0.00 |
| Wed 11/19 | 64.00 | 0.00 | 7,883.75 | 0.00 |
| Thu 11/20 | 80.75 | 0.00 | 5,912.75 | 0.00 |
| Fri 11/21 | 33.75 | 0.00 | 8,870.00 | 0.00 |
| Sat 11/22 | 45.75 | 0.00 | 4,927.75 | 0.00 |
| Sun 11/23 | 34.75 | 0.00 | 3,942.50 | 0.00 |
| Total | 357.75 | | 45,333.50 | |

Ready

*FIG. 11*

| Forecast Event Ratio | | | | | |
|---|---|---|---|---|---|
|  | SALES | ITEMS | CUSTOMERS | WEIGHTS | 180 |
| Mon 11/24 | 1.00 | 1.00 | 1.00 | 1.00 | |
| Tue 11/25 | 1.00 | 1.00 | 1.00 | 1.00 | |
| Wed 11/26 | 1.00 | 1.00 | 1.00 | 1.00 | |
| Thu 11/27 | 1.20 | 1.10 | 1.05 | 1.22 | |
| Fri 11/28 | 1.00 | 1.00 | 1.00 | 1.00 | |
| Sat 11/29 | 1.00 | 1.00 | 1.00 | 1.00 | |
| Sun 11/30 | 1.00 | 1.00 | 1.00 | 1.00 | |

| Volume Ratio: CUSTOMERS | | | | | |
|---|---|---|---|---|---|
| | SALES | ITEMS/COSTS | CUSTOMERS | WEIGHTS/CUSTS | |
| Mon 11/17 | 7.36 | 2.65 | 1.00 | 0.41 | 185 |
| Tue 11/18 | 7.32 | 2.64 | 1.00 | 0.51 | |
| Wed 11/19 | 7.35 | 2.65 | 1.00 | 0.43 | |
| Thu 11/20 | 7.41 | 2.67 | 1.00 | 0.29 | |
| Fri 11/21 | 7.30 | 2.64 | 1.00 | 0.51 | |
| Sat 11/22 | 7.36 | 2.65 | 1.00 | 0.91 | |
| Sun 11/23 | 7.36 | 2.65 | 1.00 | 0.83 | |
| Average | 7.35 | 2.65 | 1.00 | 0.55 | |

| Daily Ratio | | | | | |
|---|---|---|---|---|---|
| | SALES | ITEMS | CUSTOMERS | WEIGHTS | |
| Mon 11/17 | 0.13 | 0.13 | 0.13 | 0.10 | 190 |
| Tue 11/18 | 0.17 | 0.17 | 0.17 | 0.16 | |
| Wed 11/19 | 0.17 | 0.17 | 0.17 | 0.14 | |
| Thu 11/20 | 0.14 | 0.14 | 0.14 | 0.08 | |
| Fri 11/21 | 0.19 | 0.19 | 0.19 | 0.19 | |
| Sat 11/22 | 0.11 | 0.11 | 0.11 | 0.19 | |
| Sun 11/23 | 0.09 | 0.09 | 0.09 | 0.14 | |
| Total | 1.00 | 1.00 | 1.00 | 1.00 | |

BUSINESS VOLUME AND WORKFORCE REQUIREMENTS FORECASTER

RELATED APPLICATIONS

This application claims benefit to U.S. Provisional Application No. 60/214,393, filed Jun. 28, 2000, entitled "Business Volume and Workforce Requirements Forecaster Engine," by Chandan Adhikari, John Anderson, Mark E. Bucci, Paul J. Piccolomini, Dennis Smith and Joseph A. Velazquez, the entire teachings of which are incorporated herein by reference.

BACKGROUND OF THE INVENTION

The scheduling of employee workshifts is typically based on work requirements, and is usually done in incremental time periods such as 15-minute periods.

For example, a supermarket may need four baggers and five cashiers between 9:15 AM and 1:15 PM, and only two baggers and three cashiers from 1:15 PM until 5:30 PM, at which time the need may again be elevated. Of course, scheduling must be satisfied from the existing pool of employees. At the same time, many rules or constraints must also be satisfied. These rules include minimum and maximum hours for a given employee, rules related to employment of minors, rules relating to break times, rules dictated by union contracts, etc.

Workforce requirements, that is, the specified need for so many workers to fill a certain time slot for a specific job or task, are typically provided either by a manager's best guess, or by some forecasting mechanism. Forecasters typically look at historical data from corresponding or similar periods from the past to produce an estimate of expected workload requirements. These requirements can then be fed to the scheduler.

SUMMARY OF THE INVENTION

A complete workforce management system allows users to forecast, schedule, track, and pay their workforce according to their business' expected sales mix, balancing the need for maintaining strong customer satisfaction with the complicated scheduling and payroll demands of the workforce.

This is accomplished through the implementation of three modules: a forecaster, a dynamic scheduler, and a time and attendance module.

The forecaster, the invention described herein, processes and analyses a site's historical business mix, and provides an accurate volume and labor, i.e., workforce requirements, forecasts based on that data.

The dynamic scheduler analyzes workforce requirements in conjunction with scheduling rules required by the workplace, as well as the constraints of individual employees. It generates a schedule which best considers these three factors according to user preferences. The dynamic scheduler is described in U.S. application Ser. No. 09/599,016, filed Jun. 21, 2000, which is incorporated by reference herein in its entirety.

The Time and Attendance module tracks time and pay by employee, and calculates pay cards per employee based on the labor rules set by the user. A Time and Attendance module is described in U.S. application Ser. No. 09/524,310, filed Mar. 14, 2000, which is incorporated by reference herein in its entirety.

The forecaster determines workforce requirements by job by period of the day in such a way as to schedule an optimal number of people. It does this by using historical business volume data to create a volume forecast, distributing the volume forecast over periods of the day, and applying labor standards by job to the distributed volume to determine workforce requirements. The forecaster is supported by an extensive reporting system and comparative data feedback from the Time and Attendance module.

A "volume" is a trackable value of business activity at the user's site, such as sales or number of items sold. The forecaster tracks the actual values, i.e., the volumes, that have occurred over time, and uses that history when it creates a volume forecast. It calculates a labor forecast based on the volume forecast.

In accordance with the present invention, a method for forecasting business volume and workforce requirements includes defining both a business structure and a forecast structure, wherein certain hierarchical levels of the forecast structure map to corresponding hierarchical levels in the business structure. Business volume is forecast for a predefined duration, responsive to both a first set of historical data, and to the business and forecast structures.

A first portion of the data from the first set of historical data may be archived on a per day basis, while a second portion of the data is archived on a per period basis, where a period may cover, for example, fifteen minutes.

Forecasting business volume can be done using a daily trend forecasting algorithm, or using an exponential smoothing algorithm. One algorithm may be used for some forecast categories while the other algorithm is used for other categories.

In at least one embodiment, forecasting business volume comprises forecasting daily quantities over a predefined duration.

In addition, forecasting business volume can be performed at plural levels of the forecast structure.

In at least one embodiment, hierarchical levels of the forecast structure which map to corresponding hierarchical levels in the business structure are location, department and job. A location can be subdivided into a plurality of sub-locations.

Certain hierarchical levels in the forecast structure can be at different depths within the forecast structure than the corresponding hierarchical levels in the business structure.

At least one embodiment of the present invention includes forecasting a traffic pattern for the predefined duration, responsive to a second set of historical data. The second set of historical data can be independent of the first set, or can partially or wholly overlap with the first set.

The forecast traffic pattern is preferably a composite of historical data from a plurality of selected dates, which are selected by finding a predetermined number of dates which best match designated criteria. Such criteria, which can be weighted, include same day of week, nearest day, event ratio and same open/close time.

Preferably, workforce requirements are calculated for the predefined duration, based on the forecast business volume and on the forecast traffic pattern.

Calculation of workforce requirements can include task level consolidation. Specific tasks within a job are scheduled, where each task is associated with a standard, and consolidating the scheduled tasks are consolidated into a job schedule. The decision to apply a standard can be based, for example, on economy of scale.

In at least one embodiment, calculating workforce requirements includes resource leveling. Resource leveling includes repeatedly determining valleys in a preliminary schedule, ranking the valleys, assigning at least one unassigned task to a highest-ranked valley. Valleys can be ranked, for example, based on their depth and width. For example, a valley's rank may be computed as (D/W)*C, where D is the valley's depth, W is the valley's width, and C is the valley's rounding cost. Valleys can be determined by first determining peaks in the preliminary schedule. Preferably, at least one unassigned task is assigned to a lowest portion of the highest-ranked valley.

The calculation of workforce requirements can include dynamic standard assignment, wherein different metrics are selected at different times, and where a task is associated with a plurality of standards. The selection of metrics at a specific time can be responsive to conditions, for example, weather conditions such as outdoor temperature, at the specific time.

In at least one embodiment, an event calendar is defined, and at least one event is selected from the event calendar such that the event is considered in the step of forecasting. For example, if the selected event does not occur during the forecast period, its influence is removed from the forecast if the event occurred during a corresponding period from which the historical data was taken. On the other hand, if the selected event does occur during the forecast period, its influence is added to the forecast if the event did not occur during a corresponding period from which the historical data was taken, since such influence would by default be missing in the forecast due to the non-occurrence of the event in the historical data.

An event can be associated with at least one category in the forecast structure, and a plurality of events can be selected for a particular day.

When calculating forecast values for an upcoming day marked with some event, a search is conducted for historical dates marked with the same event marker. Upon finding such a date, a ratio is calculated of volume activity associated with the historical date to the volume activity of plural days surrounding the historical date. A forecast for the upcoming forecast day is calculated as if the forecast day were a normal, non-event day. Finally, the forecast is adjusted by the calculated ratio. This can be done for each business volume.

Preferably, business volume types are user-definable, and can include any or all of sales volume, number of transactions, and number of items.

At least one embodiment includes tracking only a subset of volume types at a particular location.

The forecast structure comprises plural hierarchical levels of categories.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is a table illustrating how labor standards can be defined based on volumes.

FIG. 11 is a view of a sample screen shot which is presented to the user when the forecaster is invoked.

DETAILED DESCRIPTION

A preferred embodiment of the present invention is a flexible workforce requirements forecaster. The flexibility of the forecaster is based on two partially dependent structures: a business structure, and a forecast structure. Each is defined by a user.

Business Structure

The "business structure" describes business operations. The business structure is made up of "labor allocation classes." A labor allocation class is a storage entity into which labor may be measured and tracked for periods of time.

In one embodiment, up to ten labor allocation classes can be defined.

Figure 1:
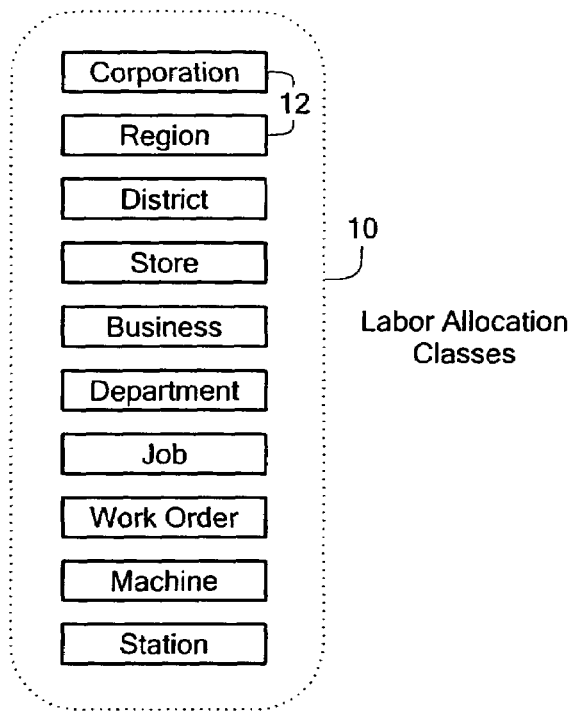
FIG. 1 is a diagram illustrating a sample business structure as could be defined within the present invention.

FIG. 1 illustrates a sample business structure 10 which uses ten possible labor allocation classes 12, such as "Corporation", "Region", etc.

Labor allocation classes may be set up in a hierarchical format, for example, Business: Department: Job. Note, however, that in one embodiment, each class in the business structure hierarchy may only have a single child class, i.e., multiple child classes are not allowed. For example, the Department class cannot have both Job and Machine classes under it.

Figure 2:
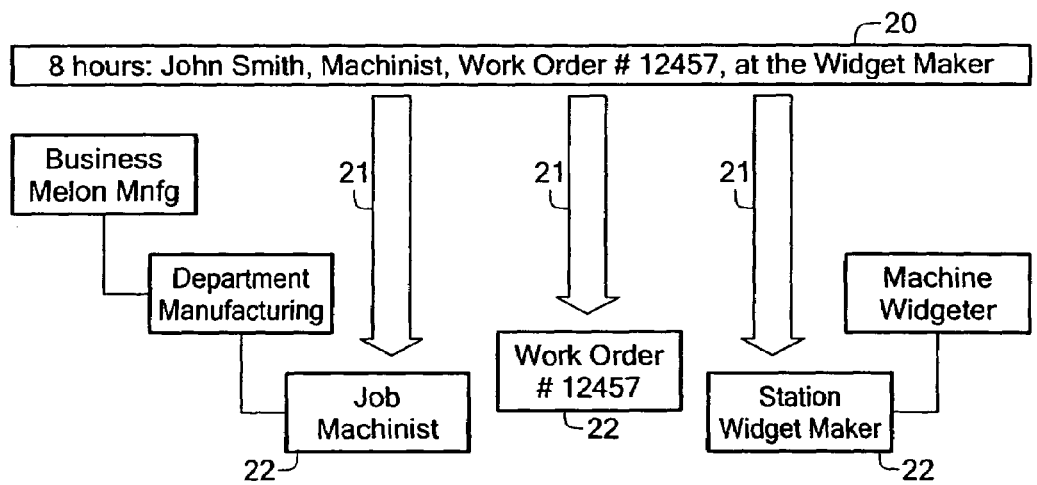
FIG. 2 is a schematic diagram which illustrates how the an embodiment of the present invention can allot time into one or more labor allocation classes.

FIG. 2 is a schematic diagram illustrating how time is allocated into one or more labor allocation classes. In this example, an employee John Smith has worked for eight hours at the "machinist" job, on Work Order #12457, at the machine "Widget Maker."

The time 20 that John Smith worked, i.e., the eight hours, can be categorized into each one of these classes 22, i.e., Job, Work Order #and Machine, as indicated by the arrows 21. Labor allocated into a hierarchy is categorized and stored at the lowest level 22, and summed up in a consolidation of child values at each parent level.

Figure 3:
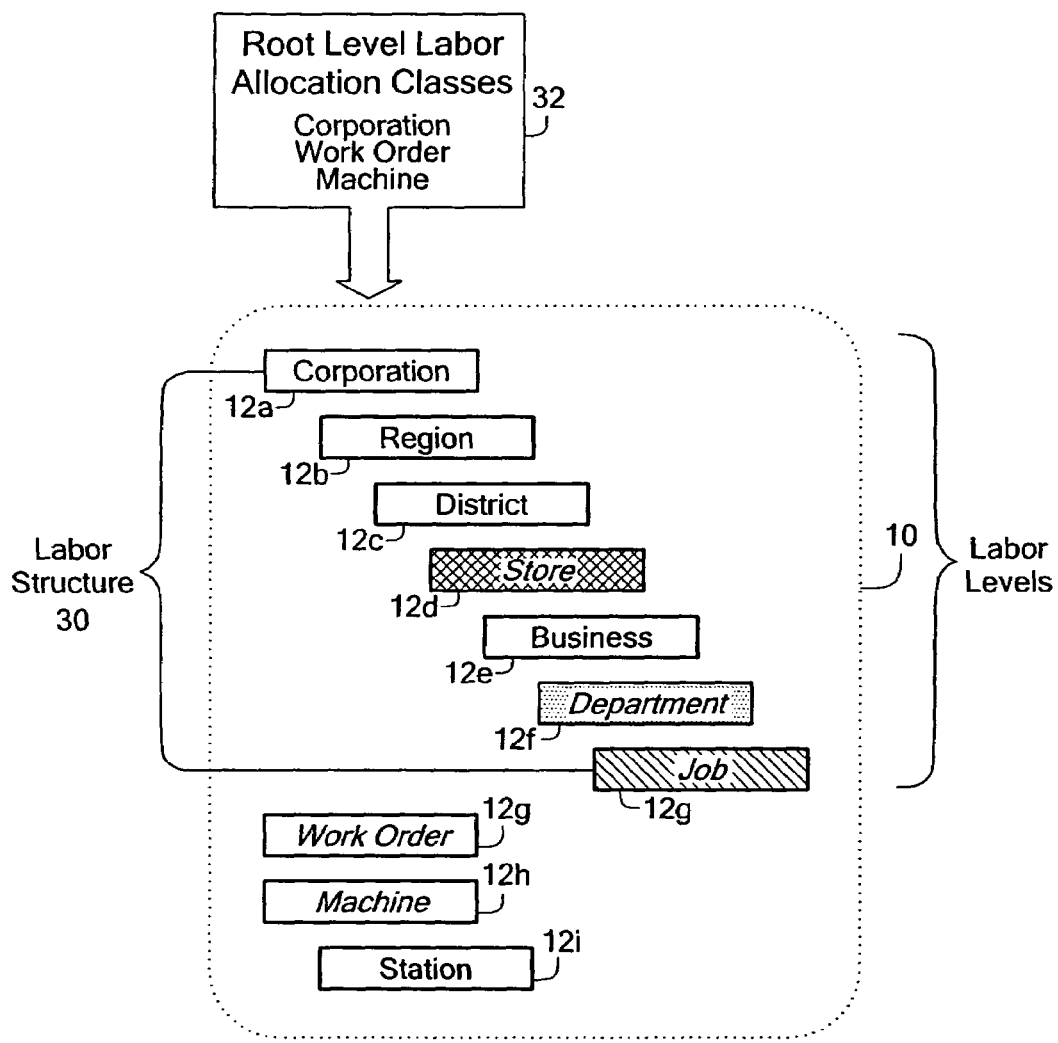
FIG. 3 is a schematic diagram illustrating a sample labor structure defined within an embodiment of the present invention.

FIG. 3 is a schematic diagram illustrating a "labor structure" 30 into which labor allocation classes are preferably organized, within the business structure 10. A "labor structure" is the collection of labor allocation classes, structured in hierarchical format, within which workforce requirements are generated and employees scheduled. A component of the labor structure is called a "labor level." For example, in the example of FIG. 3, "Corporation" is the top labor level 12a in the labor structure 30.

In one embodiment, three specific labor levels are required for forecasting: the job level, the department level and the site level.

The job level labor allocation class 12g is the level at which workforce requirements are fed to the scheduler.

The department level labor allocation class 12f is the level at which job-level workforce requirements are summed.

The site or store level 12d represents the top of the forecast structure, which is discussed below.

Note that in the business structure 10 of FIG. 3, there are three labor allocation class hierarchies. The root level classes are Corporation 12a, Work Order 12g and Machine 12h. The Work Order class 12g does not have any child classes, while the Machine class 12h has a Station child class 12i.

Figure 4:
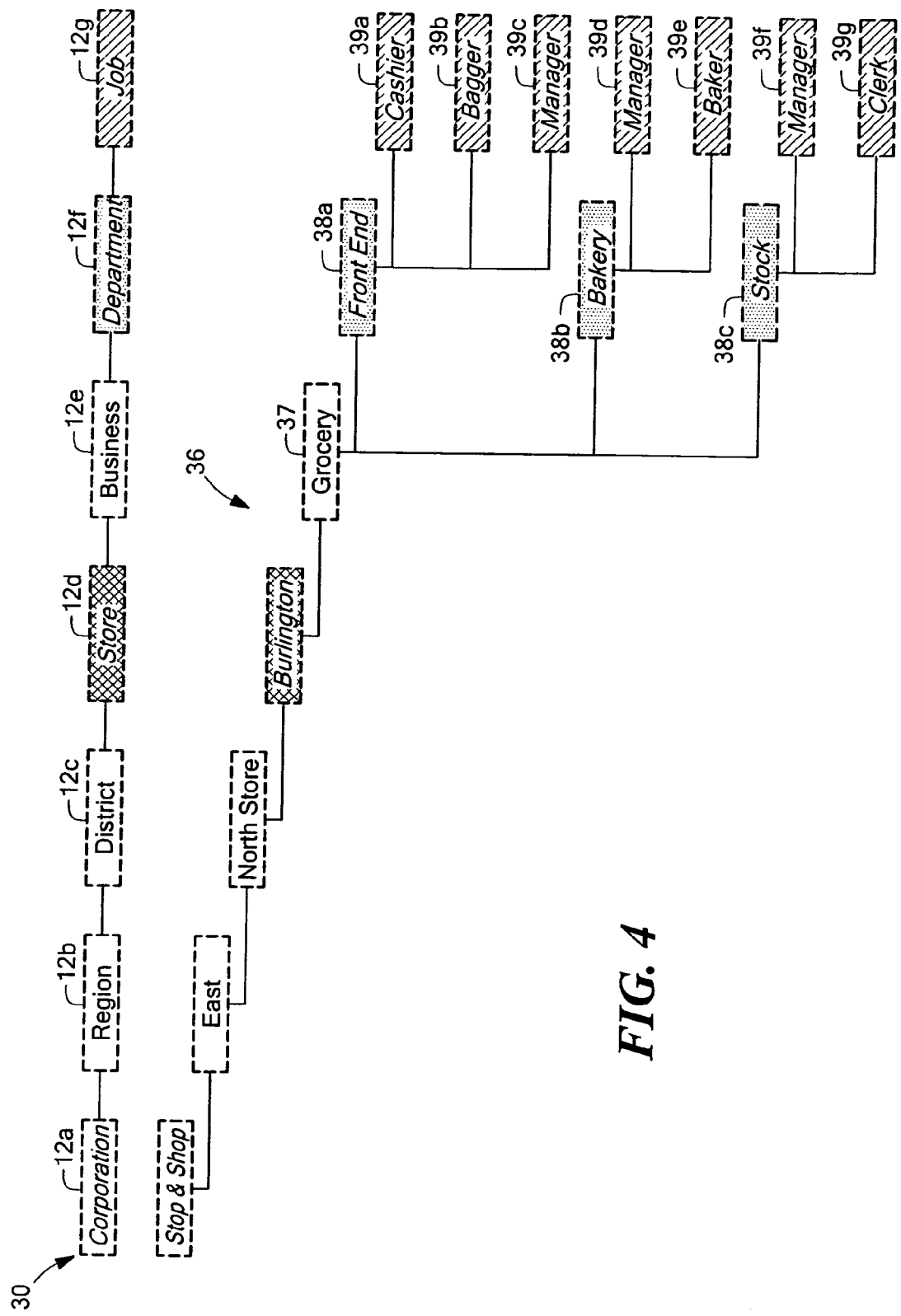
FIG. 4 is a hierarchical chart providing an example in which three departments have been defined.

FIG. 4 is a hierarchical chart illustrating an exemplary implementation in which three departments, "Front End" 38a, "Bakery" 38b and "Stock" 38c have been defined. These departments exist below the "Grocery" 37 business level.

Within each of these departments 38a–38c, there are defined jobs. For example, the jobs of "Cashier" 39a, "Bagger" 39b and "Manager" 39c have been defined within the "Front End" department 38a. Similarly, the jobs of "Manager" 39d and "Baker" 39e have been defined within the "Bakery" department 38b and the jobs of "Manager" 39f and "Clerk" 39g have been defined within the "Stock" department 38c.

Figure 5:
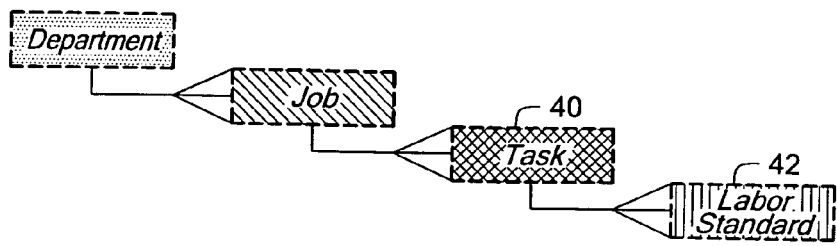
FIG. 5 is a schematic diagram illustrating tasks and labor standards within the labor structure of FIG. 3.

FIG. 5 is a schematic diagram illustrating tasks and labor standards within the labor structure. "Tasks" 40 and "labor standards" 42 are sub-components of the job level necessary for the building of workforce requirements. These sub-components are not labor allocation classes, but rather are specific structures which are sub-components of the job level.

"Tasks" 40 are granular and reportable work functions of a job for which labor standards are defined. A specific task can only belong to one parent job. Tasks are the consolidation point between jobs and standards. A task 40 is made up of labor standards 42 which define the workload. Task levels enable the times calculated by standards to be summed together for eventual task assignment.

A "labor standard" 42 is a rule, and can be implemented as, for example, an equation to calculate the amount of labor required for a specific work function given a measurable volume, or a constant. Examples of productivity standard are 1.5 seconds per item, 30 seconds per tender and 30 minutes per day in the bakery.

Figure 6:
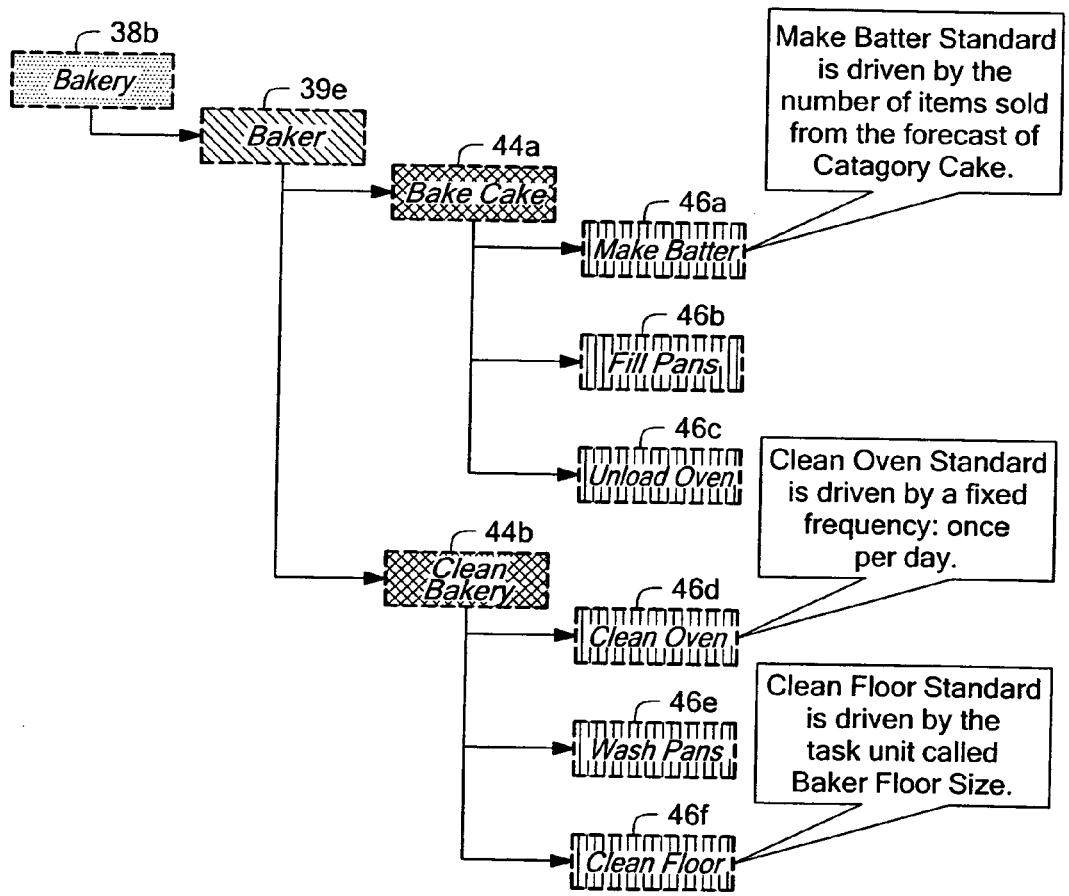
FIG. 6 is a schematic diagram illustrating an example of tasks and labor standards defined within an embodiment of the present invention.

FIG. 6 is a schematic diagram illustrating a specific example of tasks and labor standards. Within the "Bakery" department 38b, there exists a "Baker" job 39e. For the Baker job, two tasks have been defined: "Bake Cake" 44a and "Clean Bakery" 44b. These tasks are in turn made up of labor standards.

For example, the "Bake Cake" task 44a has three defined labor standards: "Make Batter" 46a, "Fill Pans" 46b and "Unload Oven" 46c. The "Make Batter" standard 46a may, for example, be driven by the number of items sold from the forecast of a "Cake" category. Categories are discussed below.

The "Clean Bakery" task 44b also has three defined labor standards: "Clean Oven" 46d, "Wash Pans" 46e and "Clean Floor" 46f. The "Clean Oven" standard 46d is driven by a fixed frequency: once per day. The "Clean Floor" standard 46f is driven by a fixed task unit called "Baker Floor Size."

The forecaster calculates the workforce requirements for each labor standard, and sums the results at the task level for each task. Employees are scheduled to a job by the scheduler in response to the workforce requirements, and eventually assigned to a task by their manager.

Forecast Structure

In addition to the business structure defined above, a "forecast structure" must also be defined. The forecast structure is a hierarchical set of data collection points, called "categories," that reflects the organization of a site's business volume information for forecasting purposes.

Categories provide the connection between the forecaster and the business volume data stored in volume data files, which may, for example, be external. Categories are the building blocks of the forecaster database, and represent the available levels of business volume tracking. The forecaster uses categories as storage points for actual volume data, e.g., the amount of business conducted at a site, as well as volume forecasts.

From these storage points, the forecaster first creates volume forecasts, that is, it determines how much business the site expects to do. Then, the forecaster distributes volume forecast edits to the allocation classes within each site. Finally, the forecaster identifies the connection to departments for comparing workforce requirements.

Categories provide the logical structure of the user's forecast structure. They may exist as low-level units, or as consolidation points of lower-level categories. The forecast structure is always hierarchical. No low-level category may belong to more than a single higher-level category, one level directly above. The number of category levels may go as deep as desired.

The makeup of the forecast structure can be defined by the user. For example, the user may wish to model the way customers pay for their merchandise. In this case, they might set up a parent category of "Front End," which represents the check-out area of a store, with children of "cash," "check," "debit" and "credit."

Another user may wish to view only site transactions according to where they occurred, for example, at regular registers or express registers. This user might set up a forecast structure to have a parent category "Front End," with children of "express" and "regular."

Another user might wish to view transactions both ways: where the transactions occurred, and how they were paid. In this case, the user can set up an "express" category, with children of "cash," "check," "credit" and "debit," as well as a "regular" category, with similar children.

Figure 7:
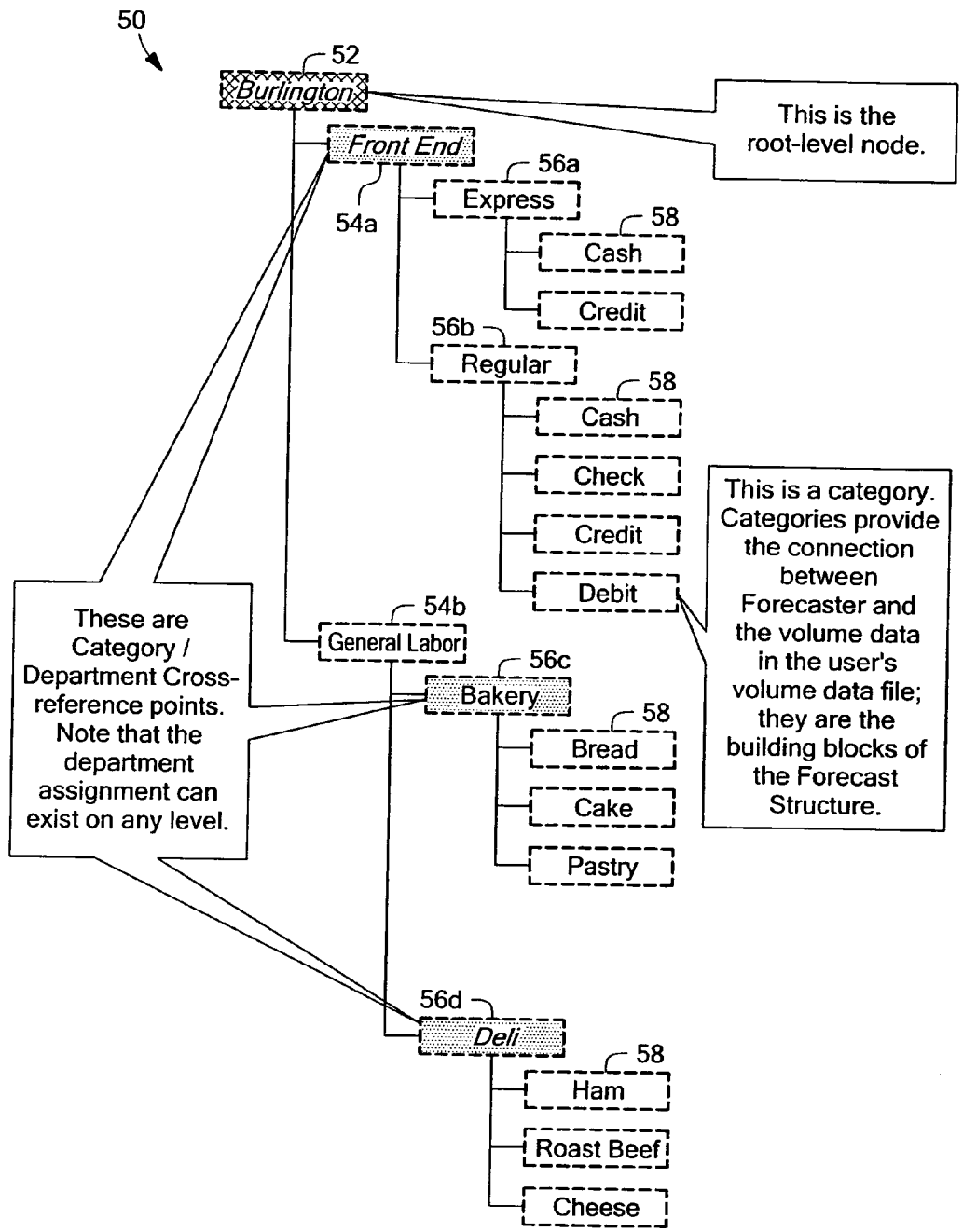
FIG. 7 is a schematic diagram of an exemplary forecast structure.

FIG. 7 is a schematic diagram illustrating an exemplary forecast structure 50. Here, the root level node 52 corresponds to a particular site in the business structure. The site "Burlington" has been divided into two categories, "Front End" 54*a* and "General Labor" 54*b*.

The "Front End" 54*a*, which represents the checkout area of the store, is further divided into "Express" 56*a*, representing express checkout lanes, and "Regular" 56*b*, representing all other checkout lanes. The "Express" 56*a* node is subdivided into "Cash" and "Credit", while the "Regular" 56*b* node is subdivided into "Cash", "Check", "Credit" and "Debit" 58.

Similarly, "General Labor" 54*b* is divided into "Bakery" 56*c* and "Deli" 56*d*. "Bakery" 56*c* is further subdivided into "Bread", "Cake" and "Pastry" categories 58 while "Deli" is subdivided into "Ham," "Roast Beef" and "Cheese" categories 58.

The "Front End" 54*a*, "Bakery" 56*c* and "Deli" 56*d* are category/department cross-reference points to the business structure. Note that the department assignment can exist at any level in the forecast structure. For example, in FIG. 7, "Front End" 54*a* is not at the same level in the forecast structure hierarchy as "Bakery" 56*c* and "Deli" 56*d*.

The makeup of the forecast structure depends on the level of detail that the user's volume collection systems can capture, as well as how the user wishes to "slice" the data and how drive labor. It is flexible enough to handle many different types of implementations.

The Forecast Structure and its Relation to Volumes

Once the forecast structure has been defined, a decision must be made as to which business volumes to track. Although between three and six different volumes are typically tracked, one embodiment of the present invention can track up to thirty-two different volumes. Examples of volumes in a retail environment are sales, items, customers, and weights.

Figure 8:
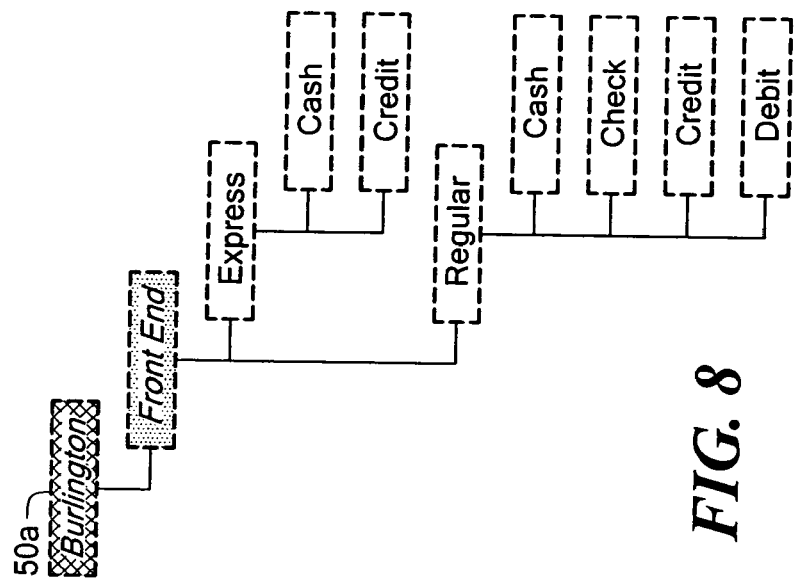
FIG. 8 is a table illustrating the relationship between the forecast structure and sources of volume data.

FIG. 8 is a table 60 illustrating the relationship between the forecast structure 50*a* and sources of volume data for each category and for each type of volume. Categories are portrayed vertically, while volume types 62, e.g., sales, items, customers, are listed along the horizontal axis. For each combination of volume and category in the forecast structure, the volume source is specified.

One type of volume data is direct feed, such as from a point of sale, on business volume for that category, e.g., Express.Cash Items. Another type of volume data is consolidated data, which may be summed from a category's children, or may be the basic level at which data is maintained. Alternatively, the user may specify, for a specific category, that no volume data is available, or the data may not be trustworthy.

FIG. 9 is a table 70 illustrating how labor standards can be defined based on those volumes. For example, for the job "Baker" in the "Bakery" department, the user might set up a standard called "Make Batter," which belongs to the "Bake Cake" task. The amount of labor required to fulfill this standard is driven by the number of cakes, i.e., cake items, that the site expects to sell.

Cross reference points between the business structure 36 and the forecast structure 50 can be specified, where the two structures are linked. These connections are made when a department from the business structure is assigned to a category in the forecast structure.

The forecaster sums workforce requirements from the job level up to the department level. Those workforce requirements can then be compared with the business volumes that they wish.

The "site" labor allocation class represents to top of the forecast structure.

A "department" is the connection point between the forecast structure and the labor structure. In the labor structure, users may attach a "department marker" to any labor allocation class above the job labor level. Jobs belong to their closest parent marked as a department. The forecaster uses the entities marked as departments as assignment points in the forecast structure for comparison of volume and labor data.

Calculation Engines

Figure 10:
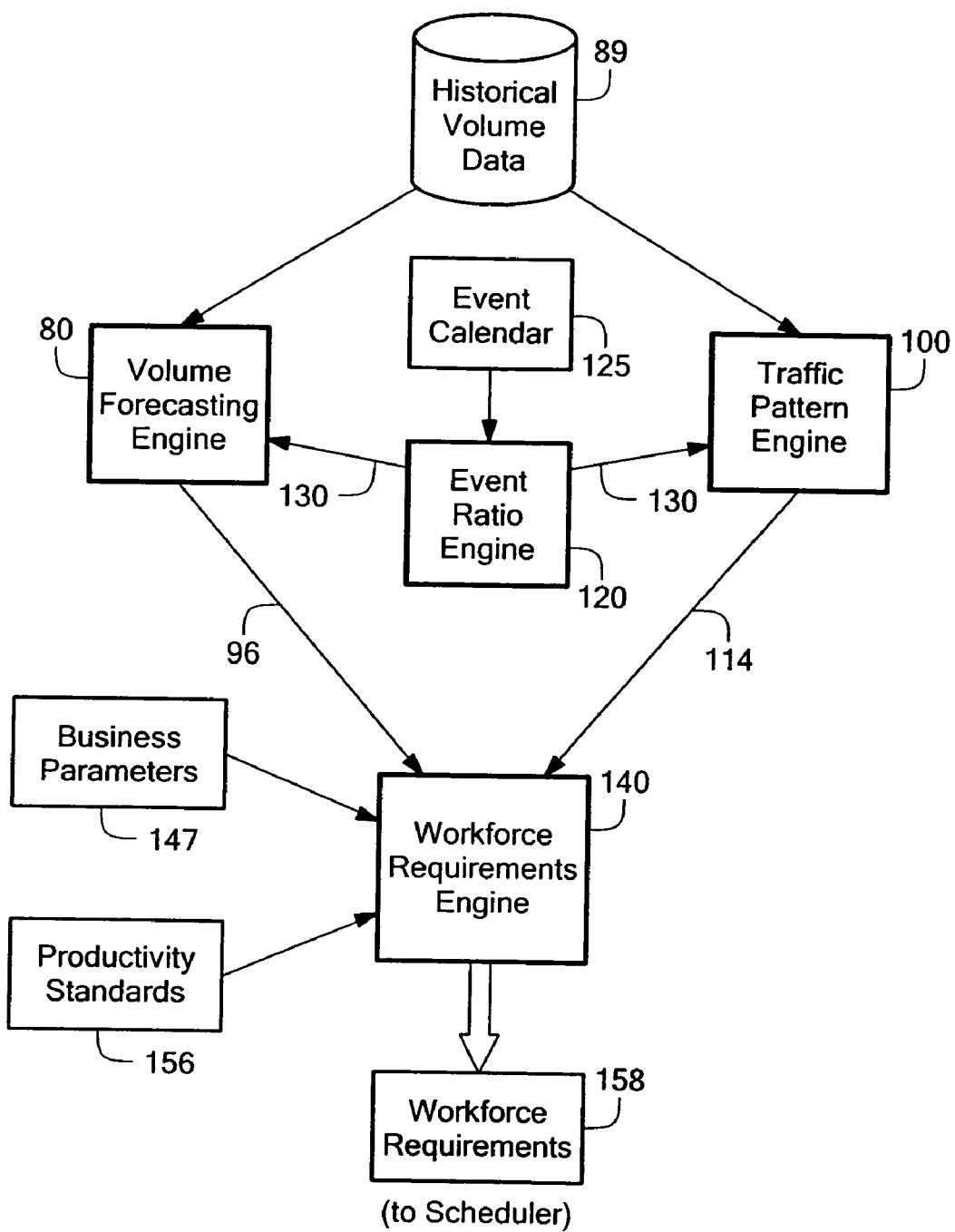
FIG. 10 is a block diagram of an embodiment of the forecaster.

FIG. 10 is a block diagram of the forecaster of the present invention, which performs a variety of calculations. Each of these calculations is executed by a calculation engine. These calculation engines include a volume forecasting engine 80, a traffic pattern engine 100, an event ratio engine 120, and a workforce requirements engine 140.

The event ratio engine 120 reads an event calendar 125 in which "events" are defined, to produce event ratios 130. These event ratios 130, together with the historical volume data 89 which may be stored, for example, in a database, are input into the volume forecasting engine 80 and the traffic pattern engine 100.

The volume forecasting engine 80 provides a forecast 96 based on, for example, daily volume summaries. A forecast can be provided at every level of the forecast structure.

The traffic pattern engine 100 produces traffic pattern percentages 114 based on, for example, 15-minute periods, and using a separate calculation from the volume forecasting engine 80.

The volume forecast engine 80 and traffic pattern engine 100, although both volume forecasters, may use completely independent sets of data from the historical volume database 89. Alternatively, the data available to these two engines 80, 100 may partially or completely overlap. Thus, a user can select independent sets of historical data for the calculations.

The outputs 96, 114 of these engines are fed to the workforce requirements engine 140 which, given various business parameters 147, e.g., operating hours, and productivity standards 156, produces a workforce requirements forecast 158, which in turn can be fed to a scheduler.

FIG. 11 illustrates a sample screen presented to the user when the forecaster is invoked.

The default forecast date selection is one period after the current period. The system establishes the current date and looks up the next forecast period by looking at the current day, and calculating the next period. The date, however, can be changed by the user to run a forecast for any week by entering a date into forecast date block 170.

At the left of the screen is the Forecast Structure tree control 172, dictating the information displayed in all tabs to the right. The tree 172, as described earlier, provides a hierarchical view of the forecast categories, and associated scheduling departments, within a business. A volume forecast, labor forecast, or both ("Forecast All") can be selected by the user from controls 181 for either the entire tree or any node on the tree.

At the right are the main tabs 174 that make up the forecasting process: Summary, Traffic Pattern, Events, and Sales History.

Event Ratio Engine

The event calendar 125 and event ratio engine 120 enable the analysis of one or more specific events relative to the history surrounding each event. An event is something that occurs that affects operation of business in a substantial and consistent manner, such as holiday or a special sale.

For example, Easter occurs in a different week each year. The forecaster adjusts the data to anticipate the next occasion. In addition, the forecaster can adjust or simply disregard the history. For example, if Easter occurs in a different period this year from last year, it is undesirable to use the historical data from last year's Easter week for the same period of this year.

A particular embodiment of the present invention supports up to four events per day, allowing for a detailed analysis. For example, this embodiment allows both "Easter" and "½ price day" to be true events on a particular day, and will base its forecast on historical data for both of these events. In addition, an event can be associated with a particular category, e.g., event:Easter→category:bakery.

Figure 12:
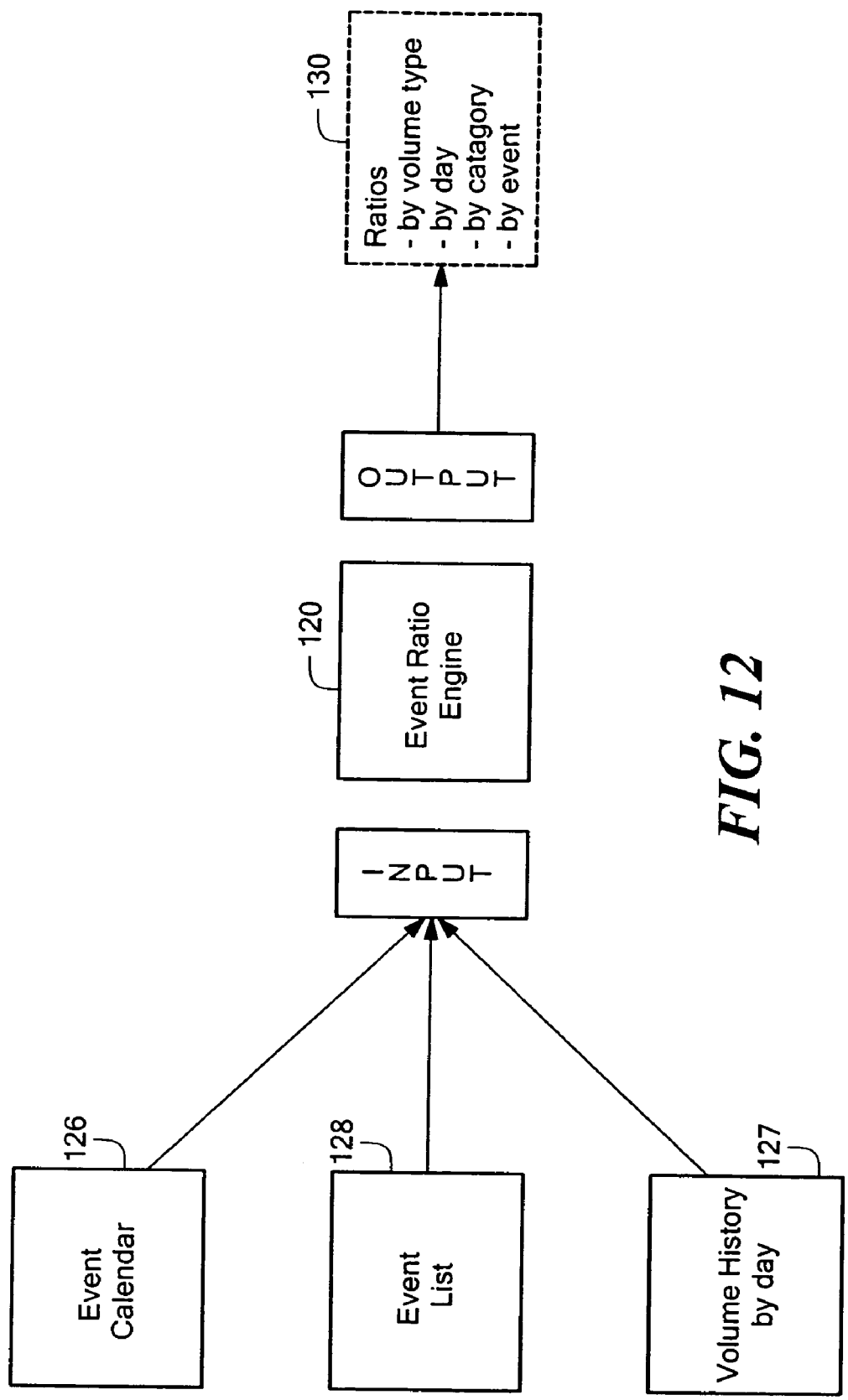
FIG. 12 is a schematic diagram of an embodiment of the event ratio engine of FIG. 10.

FIG. 12 is a schematic diagram of the event ratio engine 120 of FIG. 10. The forecaster normally relies on a weekly pattern of volume activity, based on the day of week. However, as described above, there are days when a site's expected business volume will differ from the standard day-of-week totals.

The forecaster allows the user to mark these days as "events." When calculating the forecast values for these days, the forecaster looks for dates marked with the same event marker. If it finds such a date, an event ratio, that is, the ratio of that day's volume activity to the volume activity of the days surrounding it for each volume, is calculated. The events ratio engine 120 then calculates a forecast for the upcoming day as if it were a normal, non-event day, and adjusts the volume totals by the event ratio calculated per each volume.

Conversely, when the forecaster finds dates in history that will be used to create an upcoming volume forecast, it can either adjust or discard historical event volume data points for that forecast, thereby avoiding improper effects of event history.

Still referring to FIG. 12, inputs to the event ratio engine 120 include an event calendar 126, an event list 128 and volume history 127 by day. The event calendar 126 specifies events by date and period, while the event list 128 is a list of events such as events based on conditions, e.g., weather. The event list 128 may include specific events such as Christmas Eve, or more random events such as an earthquake.

The engine 120 calculates an event ratio for each applicable volume, based on the expected amount of business volume activity, and the actual amount that occurred. The forecaster assigns the calculated ratio to the event's name, and then uses this ratio to create a forecast for a day marked with the same event ratio marker. Events can be identified by the user before they occur, or after the day has passed. Either way, after the event has occurred and been marked with an event marker, the forecaster recalculates the ratio, based on the prior history of the event.

An "occurrence ratio," alternately called the "occurrence event ratio," is a measure of the effect of an event, in particular, the extent to which normal business volume is affected by a particular occurrence of that event.

The forecast event ratios are composites of "occurrence ratios" and are used by the forecaster to calculate the effect an event has on volume history. The forecaster can then calculate how to make a day look "normal" when it encounters the same day in history while generating a raw volume forecast. The forecaster calculates a composite ratio of events such that an accurate event forecast can be calculated by multiplying the "composite ratio," that is, a weighted average of a set of occurrence ratios for a particular event, by the raw forecast.

The number of years of history that the forecaster will search to find a value with the same event identification for the calculation of composite, or "forecast event," ratios can be specified. In addition, the number of weeks of business volume history, previous to the event date, that the forecaster will use to calculate the occurrence event ratio can be specified. Finally, the user can specify whether or not to normalize business volume data for that day, e.g., adjust the value to reflect business volume data as if the event did not occur for that day, or discard the business volume data.

Events are assigned to dates after first selecting a forecast category and then selecting an event type. If the forecast category selected is above a group of attached department nodes, the event is assigned to all of the departments beneath it.

Once the category has been chosen, a date or dates to which to apply the event are selected.

The output 130 of the event ratio engine is a collection of ratios, defined by volume type, by day, by category and/or by event.

Figures 13, 14:
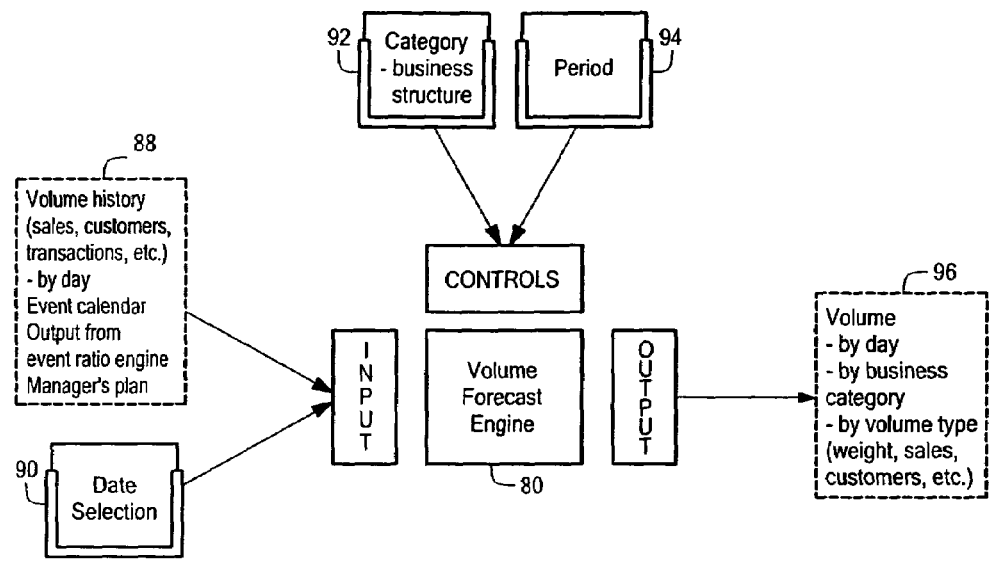
FIG. 13 is a schematic diagram of an embodiment of the volume forecasting engine of FIG. 10.
FIG. 14 is a view of a Forecast Event Ratio grid as used in an embodiment of the present invention.

As illustrated in FIG. 14, after choosing to view forecast event ratios from a pop-up menu (not shown), the Volume Forecast grid 176 (FIG. 11) is replaced with a Forecast Event Ratio grid 180 which shows daily forecast event ratios for the week.

In this example, a composite forecast event ratio is used in Thursday's volume forecast. Since no events occurred on the other days of the week, the ratios are all displayed as 1.0.

Volume Forecasting Engine

FIG. 13 is a schematic diagram of an embodiment of the volume forecasting engine 80 of FIG. 10. The volume forecasting engine 80 has the responsibility of calculating the prediction 96 of business volume for a future date. In one embodiment, one of two well-known forecasting models is used: "Exponential Smoothing" or "Daily Trend." The volume forecasting engine 80, using one of these two models, collects historical data points, making weighted adjustments for dates tagged as special "events" as discussed above, for each category in the forecast structure, and performs the appropriate calculations to predict the volume of business for a future day selected at 90. The user can then edit the volume forecast.

Inputs 88 to the volume forecasting engine 80 include volume history, such as sales, customers, transactions, etc., an event calendar, output from the event ratio engine, and a manager's plan which may be input manually.

The forecast structure 92 and a defined period 94, e.g., a 15-minute period, act as controls to the engine 80.

The resulting volume forecast is presented to the user in a volume forecast grid 176 (FIG. 11) of eight rows listing days of the forecast week plus volume total. One to thirty-two columns, depending on the configuration, list the volumes for which point of sales data is being collected. Depending on which node in the forecast category tree 172 has the focus, resulting forecast values may or may not exist in the volume columns based on what has been checked in Forecast Configurations.

The forecast values themselves are computed using either an Exponential Smoothing or Daily Trend calculation model. Which model to use can be specified for each category. The calculated value represents the aggregate business volume that the forecaster predicts for the selected future date based on a certain range of historical data. After calculation, the volume forecast is editable by the user. The volumes can be specified to have pre-configured lateral relationships with one another such that an edit to one value proportionally changes associated volume values.

In addition, edits to volume totals can uniformly change the daily values that contribute to them, so an edit to a category's volumes will change the total of the parent's volumes, as well as be distributed proportionally down to the child category volume forecasts.

There is an exception to this case, however. If both the parent volume and the children volumes are direct feeds, any edits to the parent volume's forecast will not be distributed down, nor will any edits to the child volume's forecasts consolidate up to the parent volume's forecast.

After editing a volume forecast cell, the user can choose to have the system recalculate the labor forecast based on the updated value.

A volume forecast for a week can be adjusted during calculation by the application of forecast event ratios, as described above.

Within the Volume Forecast grid 176, this information is available to the user by right clicking a column heading.

"Volume ratios" are the relationships that the volumes have to one another. For instance, of interest to the user might be the ratio of sales to customer or the ratio of sales to items.

Figures 15, 16, 17:
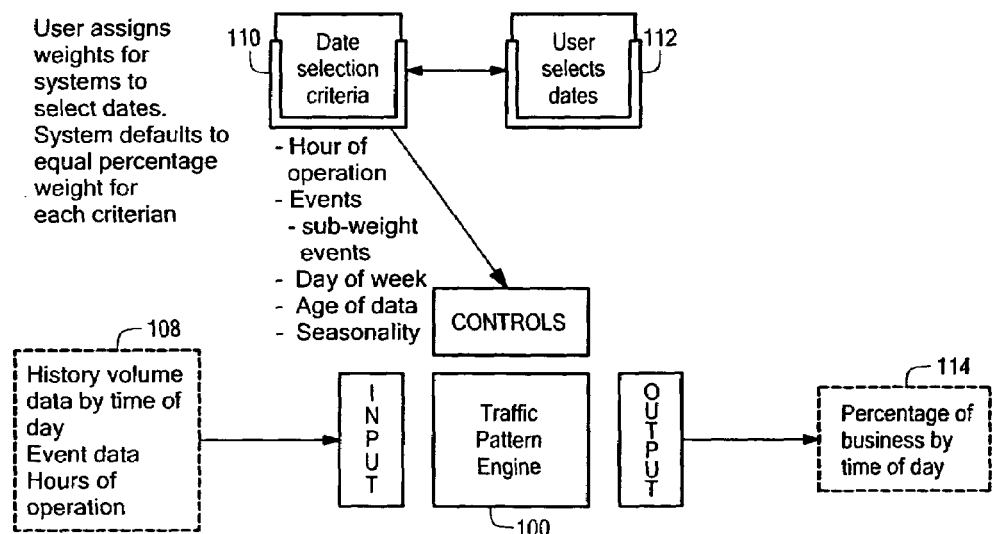
FIG. 15 is a view of a Volume Ratio grid as used in an embodiment of the present invention.
FIG. 16 is a view of a Daily Ratio grid as used in an embodiment of the present invention.
FIG. 17 is a schematic diagram of an embodiment of the traffic pattern engine of FIG. 10.

As illustrated in FIG. 15, after choosing to view Volume Ratios from a pop-up menu, the Volume Forecast grid is replaced with a Volume Ratio grid 185 which shows the ratios of all other volumes to the selected volume. In this example, CUSTOMERS is the selected column heading and the text appears when this option is selected. For the selected volume's column the number 1.00 will always be displayed.

The volume ratios can be edited by the user and the results are reflected in the corresponding cell when the view reverts back to the Volumes view 176. It is important to note, however, that edits to volume ratios do not have a lateral effect on other ratios the way edits to volume forecasts do, although others ratios that rely on the edited Volume ratio will naturally be recalculated.

FIG. 16 illustrates a Daily Ratios view 190. "Daily ratios" are the ratios that daily volumes have to their weekly totals. For instance, a user may be interested to know as a percentage how Monday's sales for a particular category counted towards the total for the week.

As in the case of Forecast Event Ratios, the column heading is not as important—all daily ratios are displayed to the user.

Traffic Pattern Engine

The traffic pattern engine 100 (FIG. 10) uses an independent data set, which may or may not overlap with the data set used by the volume forecast engine. The traffic pattern engine enables extremely flexible choosing of data by letting a user specify the relevant criteria. In one embodiment, up to four criteria can be weighted for each category. The user sets the weights, thereby defining the relevance of each criterion.

FIG. 17 is a schematic diagram of the traffic pattern engine 100 of FIG. 10. The traffic pattern engine 100 allows the forecaster to compute the distribution of the resulting volume forecast, which is based on historical traffic patterns, over periods of the business day. To accomplish this, the engine, for specific categories in the forecast structure, selects a user-defined number of dates in history based on weighted criteria for that category, and creates a composite pattern for a select future day. The engine then distributes the volume forecast for each period of the day based on that period's contribution to the daily business total.

Inputs to the traffic pattern engine 100 include historical volume data by time of day, event data and hours of operation 108.

Controls to the traffic pattern engine 100 include date selection criteria 110, which may include hours of operation, events (including sub-weight events), days of the week, the age of the data, and seasonality, and which may be subject to user-selected dates 112.

Figure 18:
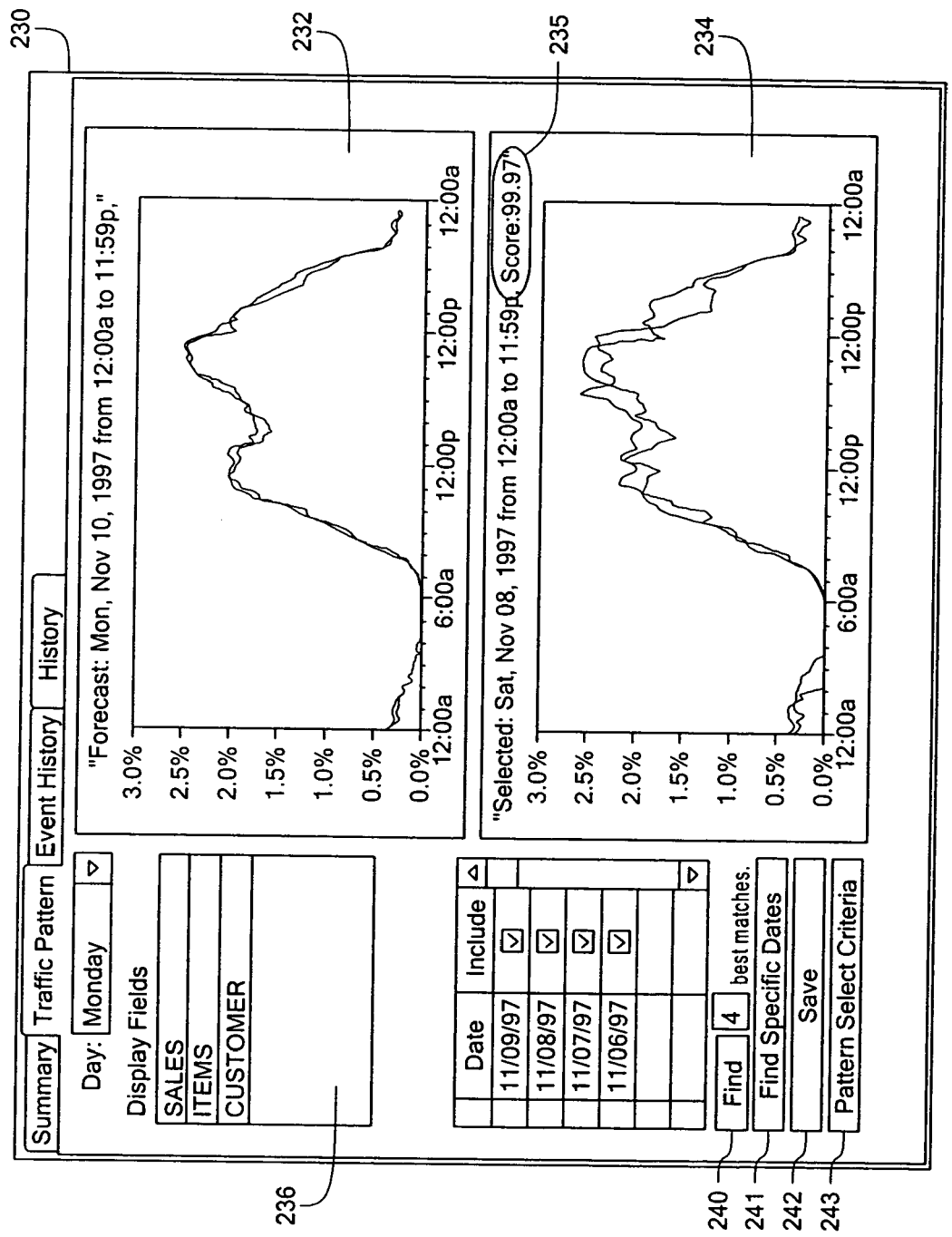
FIG. 18 is a view of a Traffic Pattern Tab of FIG. 11.

As FIG. 18 illustrates, although traffic patterns by day are calculated automatically when a forecast for a week is run, the Traffic Pattern Tab 230 allows the user to independently create, view, and manipulate the traffic patterns used by the forecaster to calculate workforce requirements.

Traffic patterns are presented in a graphical format driven by the forecast structure category selection made by the user. Two key graphs 232, 234 dominate the tab 230, with time represented along the horizontal axis, and the percentage of daily activity, e.g., sales, along the vertical axis.

In one embodiment, all applicable volume fields for a selected category are listed in box 236 using color codes. To view a particular volume field's traffic pattern, the user highlights the in box 236. A volume field, and a graph of the volume field's traffic pattern using the appropriate color is displayed. More than one volume can be selected by the user to display on the graphs.

The top graph 232 presents the traffic patterns for the selected categories and volume forecast, based on the checked dates in date grid 238. The forecast traffic pattern is a composite of the selected dates. Removing a checkmark from one of these dates changes the traffic pattern accordingly as that date will no longer contribute to the composite. This composite traffic pattern is used by the forecaster to calculate workforce requirements for any labor standards assigned to volumes within this pattern.

The bottom graph 234 displays the traffic pattern of a single date in the date grid 238. This allows a user to examine the difference between a single date's pattern and a composite pattern, which may or may not already include that date. Listed at the top of this graph 234 is a score 235 calculated for this historical date (Nov. 8, 1997) based on user defined weighting criteria, discussed below.

Updated composite traffic pattern can be viewed by the user when the "Find [n] best matches" button 240 is clicked. These updated patterns are committed to the database via the "Save" button 242. Specific dates from the volume history database can also be retrieved by the user and added to the composite traffic pattern via the "Find Specific Dates" button 241.

Figure 19:
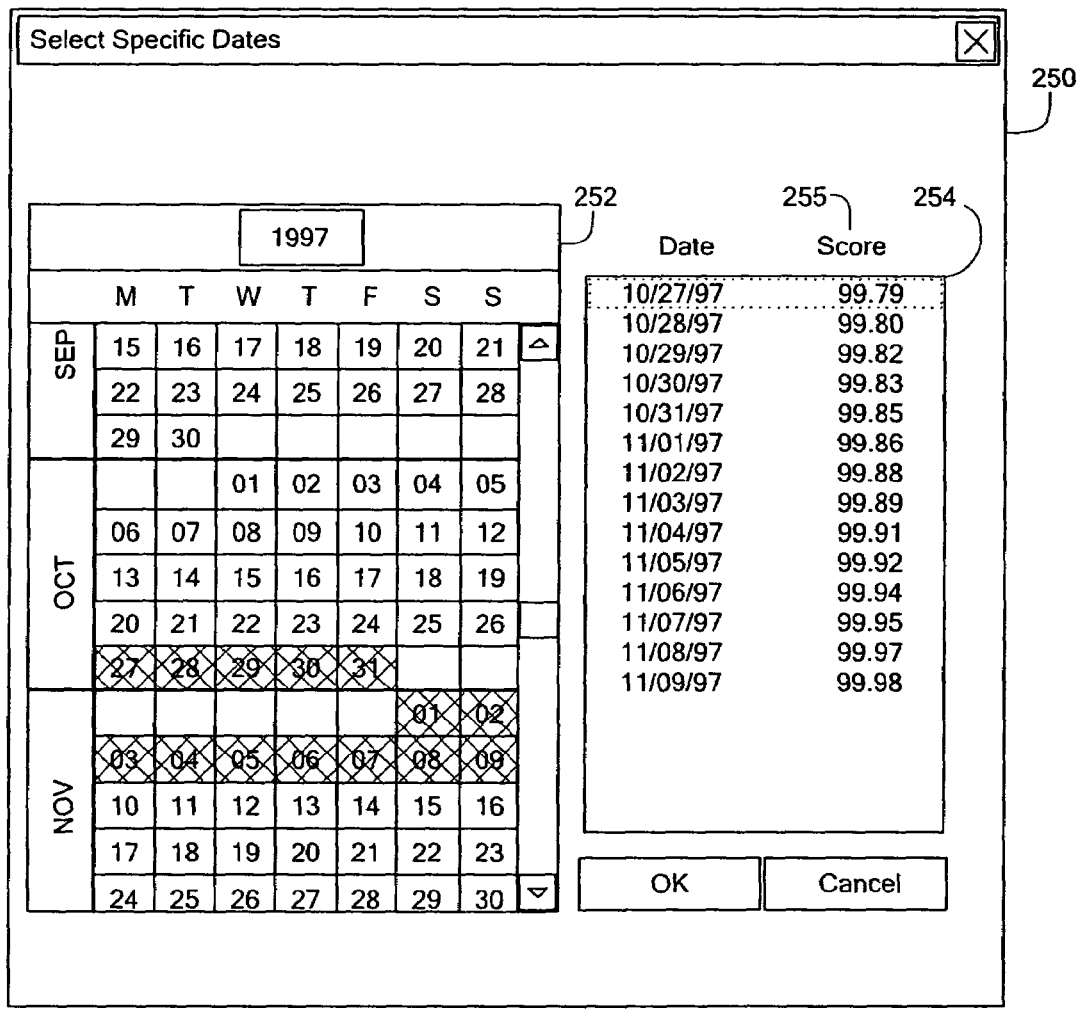
FIG. 19 is a view of a dialog box which allows selection of specific dates for the Traffic Pattern Tab of FIG. 18.

FIG. 19 illustrates a "Select Specific Dates" dialog box 250 which is displayed when the user selects the "Find Specific Date . . . " button 241 of FIG. 18. Dates selected from a calendar 252 are displayed in a list 254 with their corresponding scores 255.

Referring back to FIG. 18, the selection criteria "weight," i.e., the percent of influence a date has, used in scoring the historical traffic patterns, can be tuned by the user via the "Pattern Select Criteria" button 243.

Figure 20:
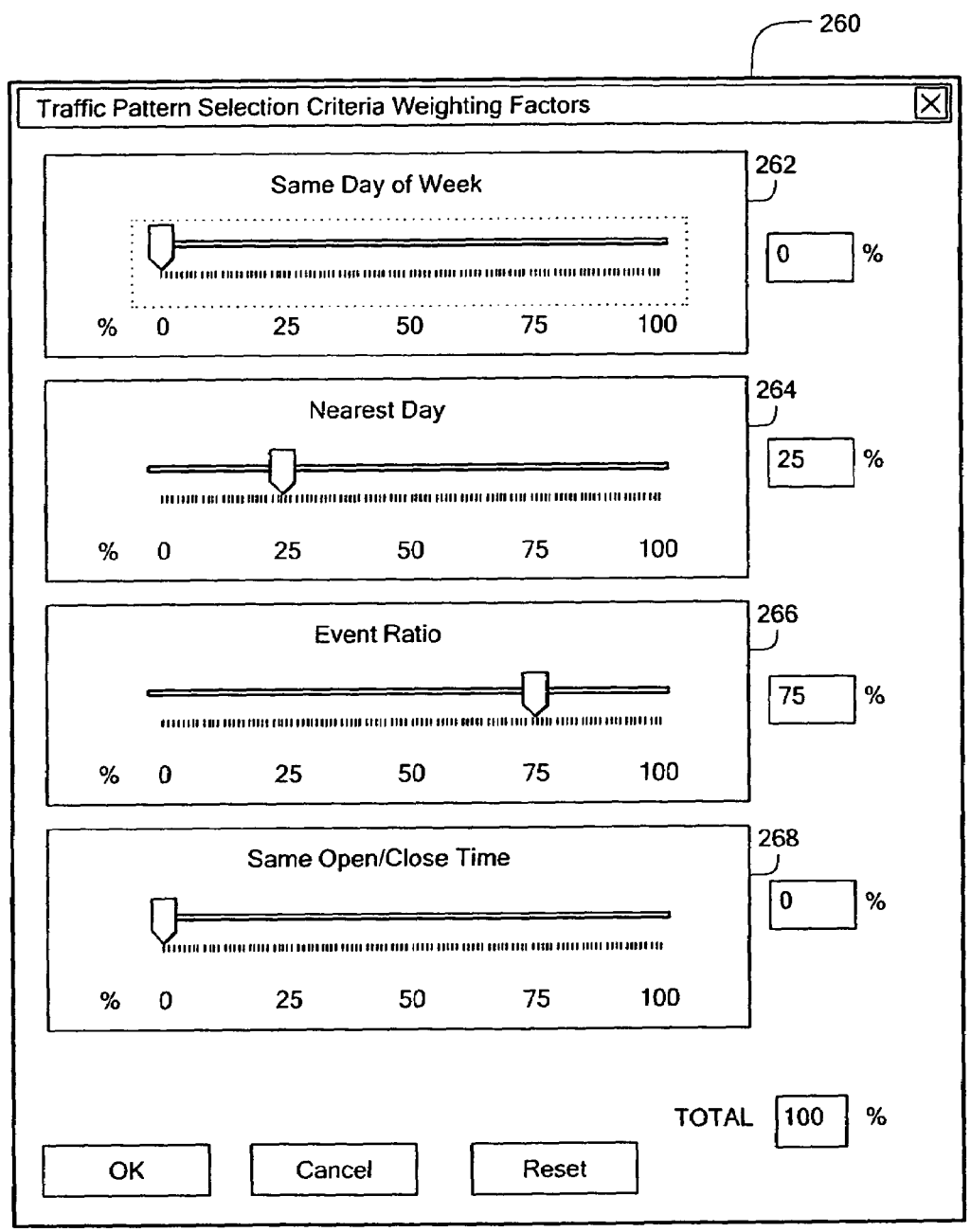
FIG. 20 is a view of a dialog box which allows weighting of selection criteria for the traffic pattern engine of FIG. 17.

FIG. 20 illustrates a "Traffic Pattern Selection Criteria" dialog box 260, which is displayed upon selection of the "Pattern Select Criteria" button 243 of FIG. 20.

Configurable settings include:
- Same Day of Week (Monday, Tuesday, etc.) 262,
- Nearest Day (Yesterday scores higher than day before) 264,
- Event Ratio (Days tagged with Event; e.g. Thanksgiving) 266, and
- Same Day Open/Close Time (08:00 am–05:00 pm) 268.

A "score" is calculated for a given date based on how closely it matches the criteria as weighted.

Workforce Requirements Engine

Figures 21, 22:
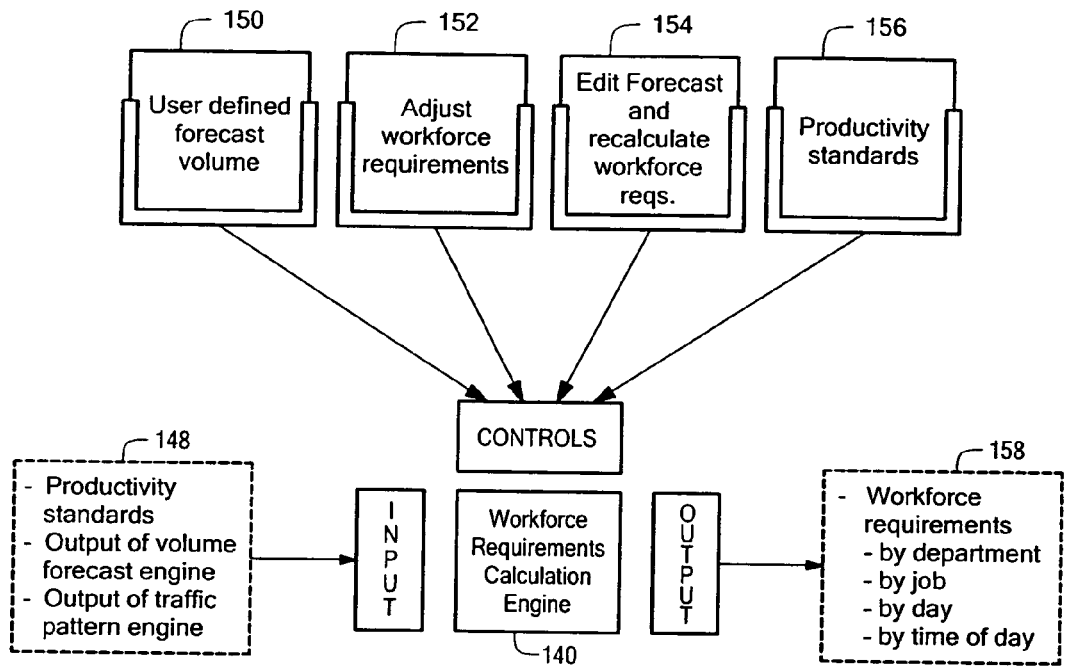
FIG. 21 is a schematic diagram of an embodiment of the workforce requirements engine of FIG. 10.
FIG. 22 is a view of a dialog box which allows specification of user-defined forecast volumes.

FIG. 21 is a schematic diagram of the workforce requirements engine 140 of FIG. 10. The fundamental task of the forecaster is to produce, for the scheduler, labor requirements based on the business that the site expects to receive, expressed in the volume forecast produced by either the volume forecast engine 80 or the traffic pattern engine 100. As discussed previously, one or more tasks are defined for each job. For each task, a number of labor standards are defined. These labor standards translate the amount of expected business activity for a site into actual labor requirements for each job, expressed in either person-minutes, or people required to work during a period of time.

Labor standards come in two basic varieties. Labor standards can be fixed standards, i.e., standards that must be done regardless of business mix, such as overhead. Alternatively, labor standards can be variable, based on business activity, predicted either by the forecaster in the volume forecast, or by the user.

For each job, the forecaster calculates the amount of labor required for each labor standard by period of the day, and sums them up into a job total by period of the day. It then compares that total with the minimum and maximum number of employees that can work that job during that period of the day, and adjusts these totals if they do not meet the minimum and maximum requirements.

As with the volume forecast, a user may edit the labor forecast as desired. Users edit workforce requirements at the job level, by period of the day. When users edit workforce requirements, the forecaster does not reconcile the edits down to the task level. Instead, it stores the difference between the sum of the task-level requirements and the job level requirements as either unassigned or unallocated workforce requirements. These values are stored at the task level.

Inputs to the workforce requirements engine 140 include productivity standards, the output 96 of the volume forecast engine 80 and the output 114 of the traffic pattern engine 100. The user can specify which of the engines 80, 114 should drive each level of business activity Controls include a user-defined forecast volume 150, Workforce requirements adjustments 152, edits to the forecast and recalculated workforce requirements 154 and productivity standards 156.

The output comprises workforce requirements 158, by department, by job, by day and/or by time of day. This is the output of the forecaster which is fed to the scheduler.

The workforce requirements calculation engine 140 uses a generic formula to calculate the labor hours from each standard. The "forecasted labor hour" for a given standard for any given period is Driver Value*Time Factor*Frequency*Distribution Factor.

The "frequency" term dictates how often the value should be applied, e.g., by period, by hour, by day, etc.

The "driver value" parameter depends on the type of the standard being evaluated. For example, for a Variable Volume Standard, the driver value for a period is the value of the volume forecast for that period. For a Static Non-Volume Standard, the driver value is a user-configured value. If an Applies Per Driver field holds a valid value, then the driver value will be normalized by dividing it by that value. If the standard has an ADAD (Accumulated Drivers Across Days) value, then the driver value is accumulated until a POA.

The "time factor" parameter is computed based on a generic formula except for the Fixed Percentage to Day Standards & Fixed Standards. For these standards, the time factor computation can be done either for a day or for a week.

Finally, the "distribution factor" parameter is computed by taking into consideration the mode of application, i.e., Traffic Pattern, Periods of Applications and Truncation of the Volumes.

In a preferred embodiment, the time at which a new day starts can be specified. This setting determines the cutoff between days.

The day of the week that represents the start day of the week can also be specified. All volume and labor forecasts begin with this day.

The length of the forecast period in which a day is divided can also be specified. Examples are 15-minute, 30-minute or 60-minute intervals. In at least one embodiment, all volume history and workforce requirement values are actually stored according to 15-minute increment, regardless of the length selected for forecasting.

The length of the forecast run, i.e., the number of weeks to forecast, can be specified.

Referring back to FIG. 11, the Labor Forecast grid 178 displays the total calculated, i.e., forecasted, labor hours for each job by day with associated totals. The view is driven by the specific forecast category having focus on the forecast tree 172 and lists a column for each job assigned to the department attached to the forecast category node.

The name of the selected department can appear above the grid 178. If the focus is on a node that has multiple departments beneath it, jobs are displayed in the grid 178 in the order the departments appear descending in the forecast structure. The label "All Departments" above the grid 178 signifies that multiple departments with multiple jobs are being displayed.

The labor forecast values, displayed in hourly increments, are the raw labor hours calculated when either a variable forecast standard is applied to the distributed volume forecast, a fixed forecast standard is calculated for a day, or a minimum/maximum value is required for a job.

Very specific, job-level data are calculated by the forecaster based on the user's volume forecasts, user-specified input, and labor standards. Known as "workforce requirements," these are the projected number of employees needed to cover the forecasted, i.e., expected volume during the specified time period. Essentially, the workforce requirements engine 140 (FIG. 10) takes the raw labor forecast hours and expresses them as actual person counts.

Figure 23:
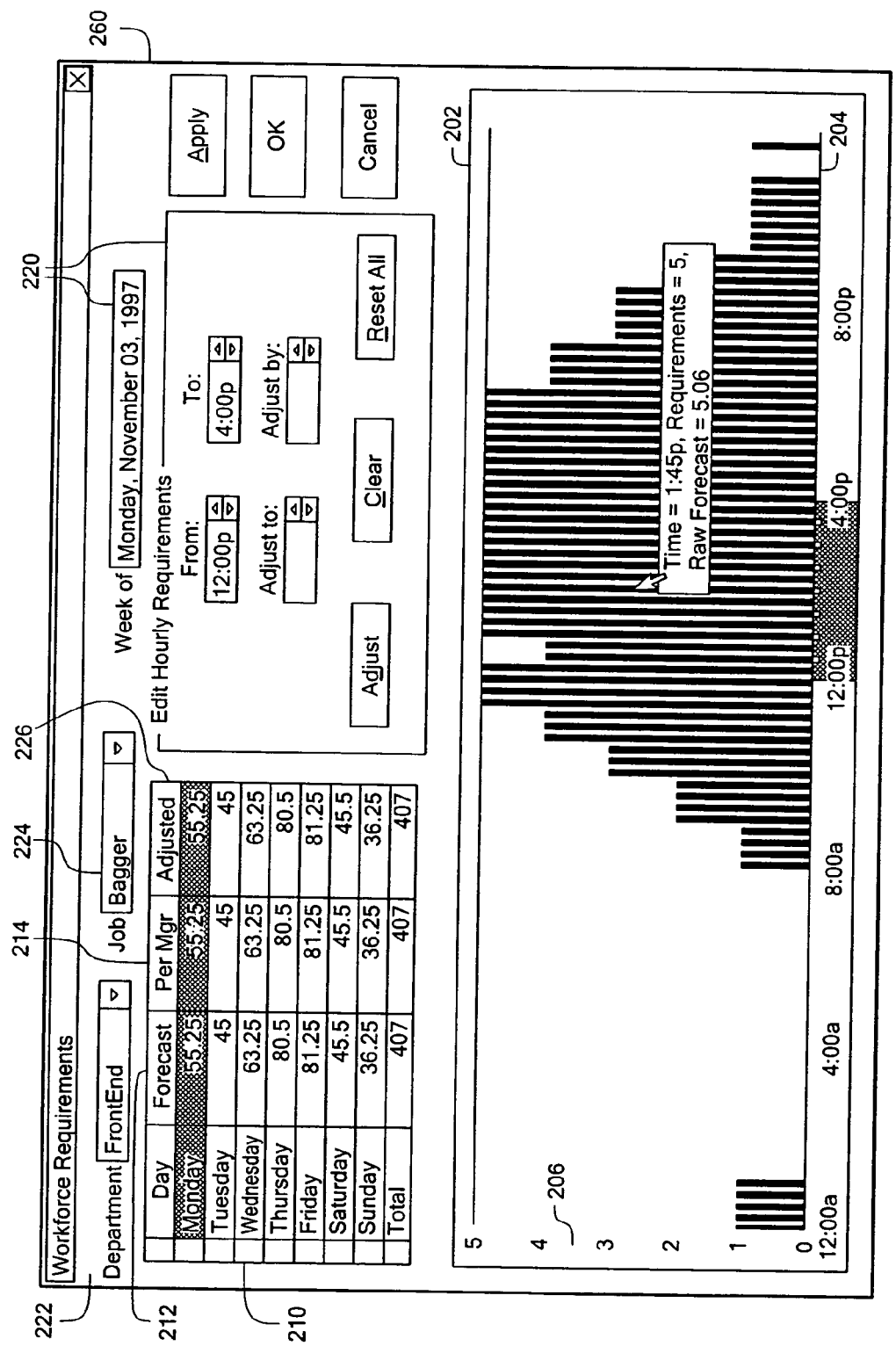
FIG. 23 is a view of a workforce requirements window of the present invention.

FIG. 23 illustrates a dialog box 200 which allows the workforce requirements to be viewed and/or edited by a user after a labor forecast is run.

A bar chart 202 provides a visual representation of the calculated workforce requirements, with hours of the day displayed along the horizontal axis 204, and number of persons along the vertical axis 206. A grid 210 lists the raw labor hours 212 by day as calculated by the system volume forecast, the labors hours 214 by day based on edits made to the volume forecast, and labor hours 216 by day based on adjustments to the workforce requirements. Controls 220 allow the user to select time spans and to configure workforce requirements adjustments.

The dialog box 200 is initially driven by the specific forecast category node having focus on the forecast structure 172 (FIG. 11) and displays the jobs for the department attached to that node. The job control 224 allows the user to select the workforce requirements by job for viewing and editing after highlighting a specific day on the grid. After activating the dialog, however, the user may select a new department via the Department control 222. Both the Department and the Job controls have an "All" option that allows aggregate workforce requirements to be displayed in the grid, either for the entire department or for the entire enterprise.

User Defined Volumes

A workforce driver is a component of every task definition, used in the calculation of workforce requirements. The vast majority of workforce requirements are based on fluctuating volume workforce drivers such as Sales, Items and Customers. There may be times, however, when workforce requirements must be calculated for a job for which no volume data is available. Examples include new employee training, deliveries, inventory, and so on—jobs that are independent of the daily flow of business volume.

FIG. 22 illustrates a dialog box 195 which is available from the Forecast Summary Tab to allow the user to specify values at runtime that can be used by the Workforce Requirements Engine 140 to calculate hours for non-volume-based jobs.

Task Level Consolidation

Schedule requirements are generated by consolidating. That is, the requirement for each standard for a task is first calculated, and then summed for the requirements for the task. This is then repeated at the job level.

Thus, the user is provided multiple levels of detail for calculation and thus has more flexibility in configuring productivity metrics. For example, a user might schedule employees by job, but prefer to assign tasks for each shift scheduled per job, while productivity standards are very detailed and granular. With only two levels, i.e., job and standard, the user has only the low level standard to assign. With three levels, i.e., job, task and standard, cashier shifts can be scheduled and tasks can be configured as groups of standards. For example, job: cashier; task: customer service; standard: ring item, tender cash, tender check, and so on.

The task level supports consolidation of standards into assignable groups.

Resource Leveling

There are some tasks that do not need to be performed at specific times. For example, floors may need to be swept just once in the morning and once in the afternoon, while the exact time is unimportant.

The workforce requirements calculation engine 140 can calculate the best time to perform the task. The present invention allows flexible tasks to be distributed within a certain window.

The problem which resource leveling addresses may best be seen as follows. Suppose the forecaster initially forecasts a requirement of 1.5 employees for some period. Obviously, the scheduler cannot schedule 1.5 people, therefore the requirement must be rounded to a whole number. However, if the requirement goes from, for example, 1.9 for a first period, to 0.9 for a second period, and finally to 2.9 for a third period, this is extremely difficult for a scheduler to handle.

Therefore, an embodiment of the forecaster identifies areas which are difficult for a scheduler. The forecaster fills gaps, i.e., valleys, by allocating resources to minimize rounding and simplify scheduling.

The resource leveling algorithm can also allocate time for breaks, which are another kind of standard.

Figure 24:
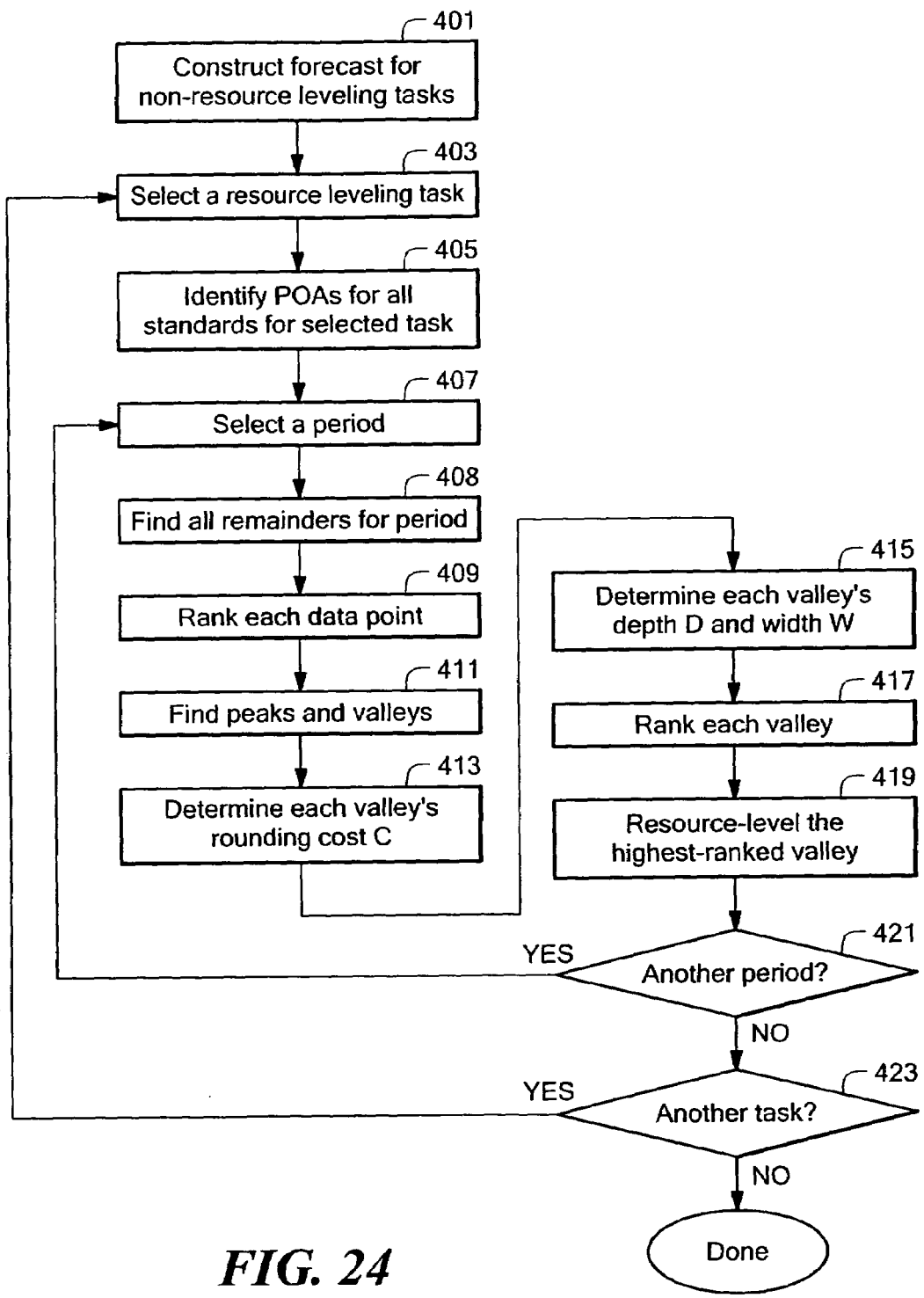
FIG. 24 is a flowchart illustrating the major steps of the resource leveling algorithm employed by an embodiment of the present invention.

FIG. 24 is a flowchart illustrating the major steps of a resource leveling algorithm employed by an embodiment of the present invention.

At Step 401, a workforce requirements forecast is constructed, in person-minutes for the entire week (considering eight days in a week), i.e., for the 768 data points corresponding to 768 15-minute periods, and for all non-resource-leveling tasks of some job.

For each resource-leveling task of the job, the loop comprising steps 403–423 is repeated.

It may not be desirable to calculate labor during certain periods, called "periods of application" or POAs. Therefore, the user can define those periods of the week in which a standard may calculate requirements, and can turn the standard off for other portions of the day, Thus, at Step 405, for each standard of the resource-leveling task, the week's periods of application, i.e., those periods during which a resource-leveling task can be assigned, are identified.

For each period, i.e., each 15-minute interval, of each POA as determined in Step 405, the loop comprising steps 407–421 is repeated.

At Step 408, all "remainders" are determined for each period. Remainders are calculated based on the following formula:

Remainder=(Rounded Person Minutes−Forecasted Person Minutes)

For example, suppose 18 minutes are forecasted for some data point. Because the forecaster works, in this example, with 15-minute periods, the forecast is rounded up to 15*2=30 minutes, and the "remainder" is 30−18=12.

At Step 409, each data point is ranked based on the difficulty of rounding the remainder for the point. That is, the points most difficult to round are ranked highest according to this principle.

For example, suppose all remainders have a value between 0 and 14 and round-down and round-up options are both available. The remainder values of 7 and 8 are the most difficult to round up or down. Hence, data points having these remainders are ranked highest. The remainder values of 6 and 9 are ranked in the second position, and so on.

At Step 411, the peaks of the forecast are determined, i.e., those points with at least one adjacent point having a lesser value, and from which the graph does not rise before first doing down. A valley is then the collection of points between two peaks. Of course, the first and last points of a forecast or a day can also serve as peaks.

At Step 413, each valley's rounding cost is determined as a function of the rounding costs of the points within the valley as determined previously in Step 409.

At Step 415, the depth and width of each valley are determined. If points A and B are the respective beginning and ending points of the valley, and point X is the lowest point within the valley, then the depth of the valley is:

depth=max(Value of Point $A$, Value of Point $B$)–Value of Point $X$ and the width of the valley is:

width=$B-A$

Figure 25:
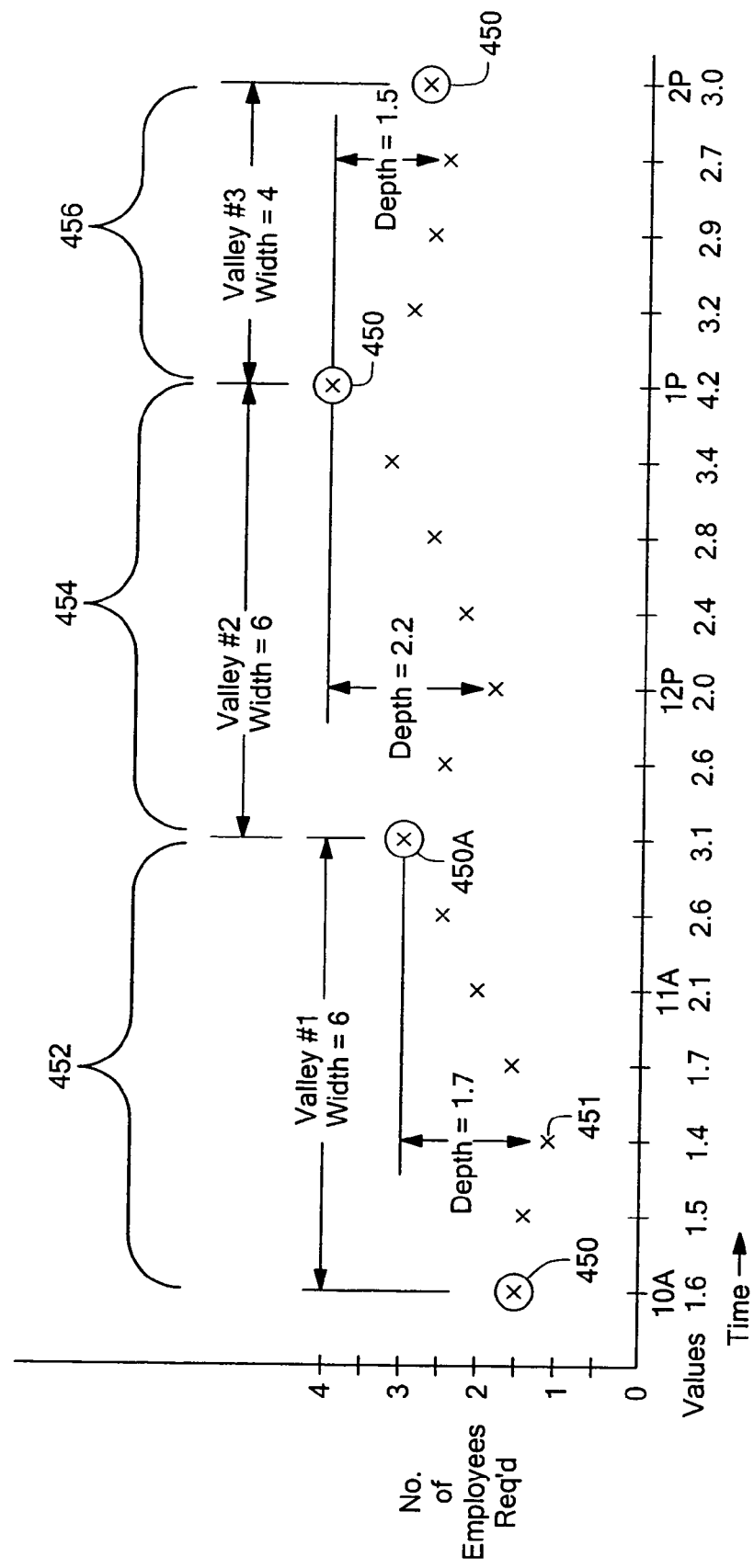
FIG. 25 is a graph illustrating the concept of valleys, and valley depth and width, with an exemplary workforce requirement forecast.

FIG. 25 is a graph which illustrates the valleys of an exemplary workforce requirement forecast. The vertical axis represents the number of employees required, while the horizontal axis represents time, partitioned into 15-minute intervals. The actual requirement values as forecasted before resource leveling are listed below the time axis, as well as represented in the graph as X's.

The peaks 450 of the graph have been identified and circled. Three valleys 452–456 have been identified.

The width and depth of each valley has been calculated and is shown in the figure. For example, Valley #1 452 has a width of 6, since it covers six 15-minute periods, from 10:00 am until 11:30 am. The depth is the difference between the values of the higher peak 450A defining the valley and the lowest point 451 in the valley, or 3.1–1.4=1.7.

Referring again to FIG. 24, at Step 417, a rank is calculated for each valley as follows:

rank=(Depth/Width)*Cost

At Step 419, resource leveling is applied to fill the highest-ranked valley. That is, a resource leveling task is allotted as much as possible to time within the valley.

Dynamic Standard Assignment

In one embodiment of the present invention, different metrics, or standards, can be applied at different times, or to different locations, depending on conditions during the forecast period or at the different locations.

For example, suppose that supermarkets are classified as either "big" or "small." A newer, larger operation will likely generate the most volume, due for example, to economy of scale. Meanwhile, older and smaller supermarkets will have certain known inefficiencies. Each type of supermarket needs its own set of productivity metrics/standards.

It will be apparent to those of ordinary skill in the art that methods involved in the forecaster may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of forecasting business volume and workforce requirements with the aid of a computer system, comprising:
   defining a business structure in the computer system;
   defining a forecast structure in the computer system, wherein certain hierarchical levels of the forecast structure map to corresponding hierarchical levels in the business structure;
   forecasting business volume in the computer system for a predefined duration, responsive to a first set of historical data, and to the business and forecast structures;
   forecasting a traffic pattern in the computer system for the predefined duration, responsive to a second set of historical data; and
   calculating workforce requirements in the computer system for the predefined duration, based on the forecast business volume and on the forecast traffic pattern,
   wherein the step of calculating workforce requirements includes resource leveling, and
   wherein the step of resource leveling comprises
   determining valleys in a preliminary schedule,
   ranking the valleys based on their depth and width,
   assigning at least one unassigned task to a highest-ranked valley, and
   repeating the steps of determining valleys, ranking the valleys, and assigning at least one unassigned task to the highest-ranked valley,
   wherein each valley's rank is computed as (D/W)*C, wherein
   D is the valley's depth,
   W is the valley's width, and
   C is the valley's rounding cost.

2. The method of claim 1, wherein a portion of the first set of historical data is by day.

3. The method of claim 1, wherein a first portion of the first set of historical data is by period.

4. The method of claim 3, wherein a period is fifteen minutes.

5. The method of claim 4, wherein a second portion of the first set of historical data is by day.

6. The method of claim 1, wherein forecasting business volume comprises using a daily trend forecasting algorithm.

7. The method of claim 1, wherein forecasting business volume comprises using an exponential smoothing algorithm.

8. The method of claim 1, wherein forecasting business volume comprises forecasting daily quantities over a predefined duration.

9. The method of claim 1, wherein forecasting business volume is performed at plural levels of the forecast structure.

10. The method of claim 1, wherein at least one hierarchical level of the forecast structure which maps to a corresponding hierarchical level in the business structure is location.

11. The method of claim 10, further comprising subdividing in the computer system a location into a plurality of sub-locations.

12. The method of claim 1, wherein at least one hierarchical level of the forecast structure which maps to a corresponding hierarchical level in the business structure is department.

13. The method of claim 1, wherein at least one hierarchical level of the forecast structure which maps to a corresponding hierarchical level in the business structure is job.

14. The method of claim 1, wherein the certain hierarchical levels in the forecast structure are at different depths within the forecast structure than the corresponding hierarchical levels in the business structure.

15. The method of claim 1, wherein calculating workforce requirements includes task level consolidation.

16. The method of claim 15, wherein task level consolidation comprises:
   scheduling specific tasks within a job, wherein each task is associated with a standard; and
   consolidating the scheduled tasks into a job schedule.

17. The method of claim 16, wherein a decision to apply a standard is based on economy of scale.

18. The method of claim 1, further comprising:
   determining in the computer system peaks in the preliminary schedule, wherein determining valleys is responsive to the determined peaks.

19. The method of claim 1, wherein the at least one unassigned task is assigned to a lowest portion of the highest-ranked valley.

20. The method of claim 1, wherein calculating workforce requirements includes dynamic standard assignment, wherein different metrics are selected at different times.

21. The method of claim 20, wherein at least one task is associated with a plurality of standards.

22. The method of claim 20 wherein selection of metrics at a specific time is responsive to conditions at the specific time.

23. The method of claim 22, wherein at least one condition is outdoor temperature.

24. The method of claim 1, further comprising:
   defining an event calendar in the computer system; and
   selecting at least one event from the event calendar such that the event is considered in the step of forecasting.

25. The method of claim 24, wherein, if a selected event does not occur during the forecast period, its influence is removed from the forecast if the event occurred during a corresponding period from which the historical data was taken.

26. The method of claim 24, wherein if a selected event occurs during the forecast period, its influence is added to the forecast if the event did not occur during a corresponding period from which the historical data was taken.

27. The method of claim 24, further comprising:
   defining an event in the computer system to be associated with at least one category in the forecast structure.

28. The method of claim 24, wherein a plurality of events can be selected for a particular day.

29. The method of claim 24, further comprising:
   when calculating forecast values for an upcoming day marked with an event, searching in the computer system for dates marked with the same event marker;
   upon finding such a date, calculating in the computer system a ratio of volume activity associated with said date to the volume activity of plural days surrounding said date;
   calculating in the computer system a forecast for the upcoming day as if it were a normal, non-event day; and
   adjusting in the computer system the forecast by the calculated ratio.

30. The method of claim 29, wherein the steps of calculating a ratio, calculating a forecast, and adjusting the forecast are executed for each business volume.

31. The method of claim 1, wherein business volume types are user-definable.

32. The method of claim 31, wherein business volume types comprise any or all of sales volume, number of transactions, and number of items.

33. The method of claim 1, further comprising:
   tracking in the computer system only a subset of volume types at a particular location.

34. The method of claim 1, wherein the forecast structure comprises plural hierarchical levels of categories.

* * * * *